(12) United States Patent
Shah et al.

(10) Patent No.: US 6,269,396 B1
(45) Date of Patent: Jul. 31, 2001

(54) METHOD AND PLATFORM FOR INTERFACING BETWEEN APPLICATION PROGRAMS PERFORMING TELECOMMUNICATIONS FUNCTIONS AND AN OPERATING SYSTEM

(75) Inventors: Mahesh V. Shah, Plano; David W. McDaniel, Dallas; James R. Vatteroni, Allen; Stephen B. Jaggers, Allen; Mark E. Worline, Allen, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/211,016

(22) Filed: Dec. 11, 1998

Related U.S. Application Data

(60) Provisional application No. 60/069,576, filed on Dec. 12, 1997.

(51) Int. Cl.[7] .................................................. G06F 13/00
(52) U.S. Cl. ............................................................ 709/223
(58) Field of Search ................................... 379/113, 201, 379/242; 709/200, 220, 221, 222, 223–224

(56) References Cited

U.S. PATENT DOCUMENTS 5,940,487 * 8/1999 Bunch et al. ......................... 379/201

FOREIGN PATENT DOCUMENTS

| 93205508 | 10/1993 | (WO) | G06F/9/40 |
|---|---|---|---|
| 9707638 | 2/1997 | (WO) | H04Q/3/00 |
| 9724837 | 7/1997 | (WO) | H04L/12/24 |
| 9731451 | 8/1997 | (WO) | H04L/12/24 |

OTHER PUBLICATIONS

Maltini, et al. "OSI System and Application Management: an Experience in a Public Administration Context", pp. 492–500, Apr. 492–500, Apr. 15, 1996, IEEE.

* cited by examiner

Primary Examiner—Robert B. Harrell
(74) Attorney, Agent, or Firm—Baker Botts L.L.P.

(57) ABSTRACT

A method of providing a software interface between application programs performing telecommunications functions and an operating system running on at least one node at a site supporting the application programs, and further forming an interface between the application programs and a telecommunications network is provided. The method includes providing a network platform manager operable to remove nodes from service, restore nodes to service, remove applications from service, and restore applications to service, providing a network system integrity manager operable to monitor the nodes and to enable failed nodes to recover, providing a configuration manager operable to interface with a host coupled to the telecom platform, providing a node platform manager operable to provide management functions for a node, providing a service manager operable to start and stop processes at the direction of the node platform manager, and providing a node system integrity manager operable to monitor inter-node links.

42 Claims, 21 Drawing Sheets

Client Processes Issued Requests are Forwarded to IprMgr in Active PM

FIG. 13
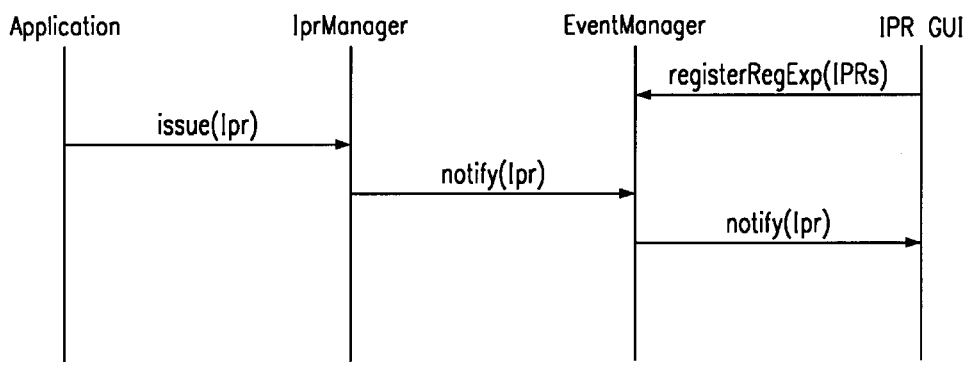
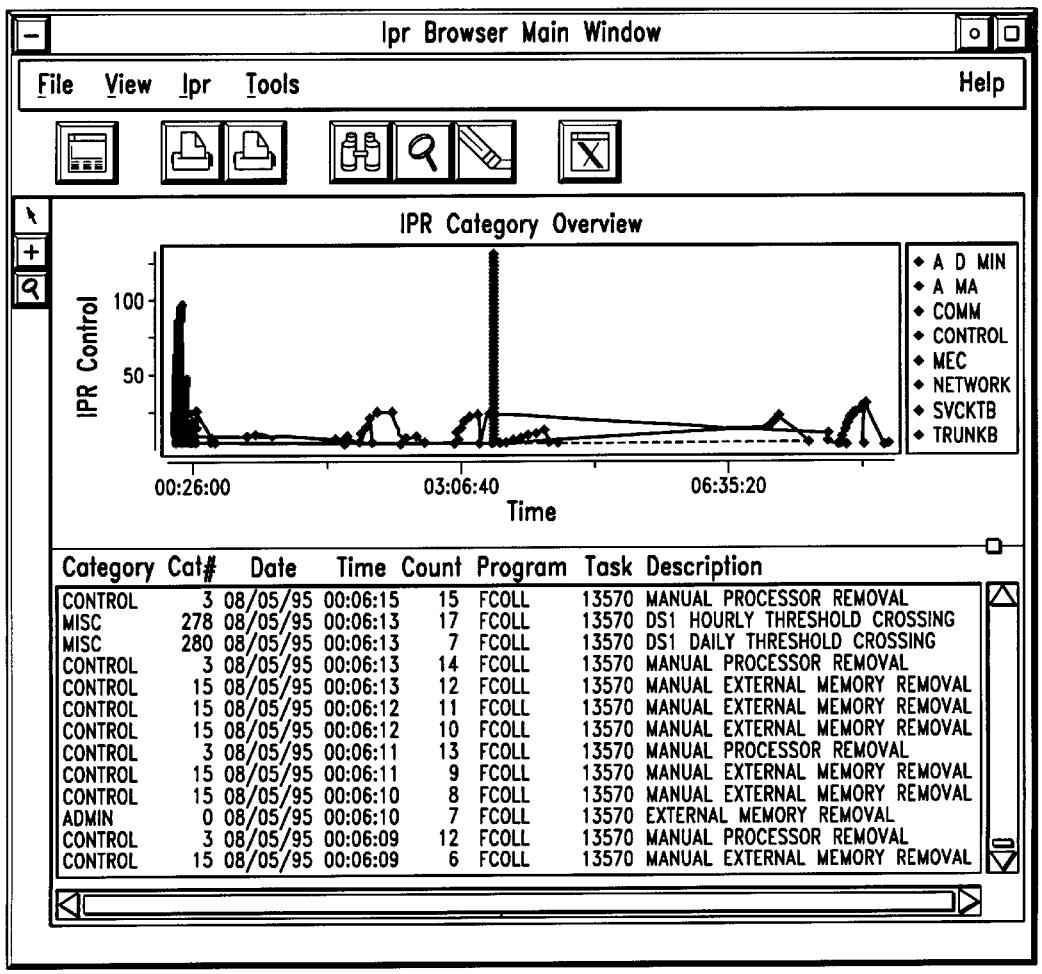
FIG. 14

METHOD AND PLATFORM FOR INTERFACING BETWEEN APPLICATION PROGRAMS PERFORMING TELECOMMUNICATIONS FUNCTIONS AND AN OPERATING SYSTEM

RELATED APPLICATION

This patent application claims benefit from provisional patent application No. 60/069,576, filed on Dec. 12, 1997, and entitled *Telecom Platform System and Method.*

TECHNICAL FIELD OF THE INVENTION

This invention is related in general to the field of telecommunications. More particularly, the invention is related to a telecom platform system and method.

SUMMARY OF THE INVENTION

In one aspect of the present invention, a telecom platform forming an interface between application programs performing telecommunications functions and an operating system running on at least one node at a site supporting the application programs, and further forming an interface between the application programs and a telecommunications network. The telecom platform includes network management processes operable to provide inter-node configuration, monitoring and management functionality, node management processes operable to provide node initialization, configuration, monitoring, and management functionality, event processes operable to provide initialization, termination, and distribution of tasks in response to predetermined events, common processes operable to provide a library of a plurality of programming tools for the development of the application programs, communications processes operable to provide message handling functionality, and distributed object processes operable to provide a distributed database repository for object-based communications.

In another aspect of the present invention, a method of providing a software interface between application programs performing telecommunications functions and an operating system running on at least one node at a site supporting the application programs, and further forming an interface between the application programs and a telecommunications network is provided. The method includes supplying network management processes operable to provide inter-node configuration, monitoring and management functionality, supplying node management processes operable to provide node initialization, configuration, monitoring, and management functionality, supplying event processes operable to provide initialization, termination, and distribution of tasks in response to predetermined events, supplying common processes operable to provide a library of a plurality of programming tools for the development of the application programs, supplying communications processes operable to provide message handling functionality, and supplying distributed object processes operable to provide a distributed database repository for object-based communications.

In yet another aspect of the present invention, a method of providing a software interface between application programs performing telecommunications functions and an operating system running on at least one node at a site supporting the application programs, and further forming an interface between the application programs and a telecommunications network is provided. The method includes providing a network platform manager operable to remove nodes from service, restore nodes to service, remove applications from service, and restore applications to service, providing a network system integrity manager operable to monitor the nodes and to enable failed nodes to recover, providing a configuration manager operable to interface with a host coupled to the telecom platform, providing a node platform manager operable to provide management functions for a node, providing a service manager operable to start and stop processes at the direction of the node platform manager, and providing a node system integrity manager operable to monitor inter-node links.

BRIEF DESCRIPTION OF THE DRAWINGS

For a better understanding of the present invention, reference may be made to the accompanying drawings, in which:

FIG. 13 is a simplified IPR processing flow diagram according to an embodiment of the present invention;

FIG. 14 is an exemplary IPR view graphical user interface according to an embodiment of the present invention;

DETAILED DESCRIPTION OF THE INVENTION

Architecture Overview

Telecom platform (TP) 10 of the present invention is a software system designed to support the development and execution of distributed, scalable, fault resilient telecommunications applications 12. Telecom platform 10 provides a unique set of tools developed for a computing environment such as UNIX. These tools include not only the set of interfaces, libraries, and executables provided by the telecom platform development and runtime packages, but also a set of conceptual components necessary to design and manage distributed, scalable, fault resilient applications.

Figure 1:
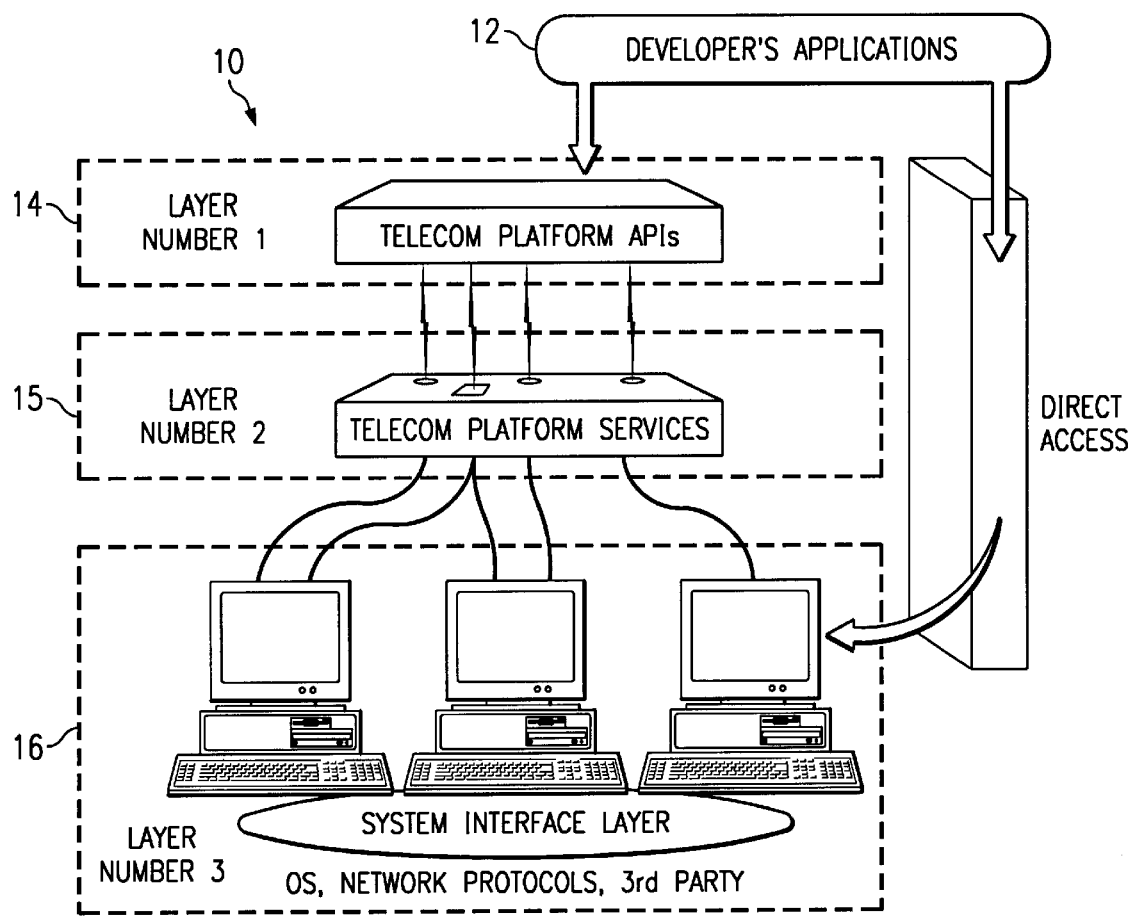
FIG. 1 is a simplified block diagram of the telecom platform architecture layers according to an embodiment of the present invention.

As shown in FIG. 1, telecom platform 10 is comprised of three distinct software layers 14–16. Layer #1 is a telecom platform application programming interface (API) layer 14; layer #2 is a telecom platform services layer 15; and layer #3 is a systems interface layer 16. Telecom platform API layer 14 provides the communication methods for accessing telecom platform services layer 15, which is comprised of telecommunications middleware services. Telecom platform services layer 15 is the software layer that provides the most commonly needed middleware services for a UNIX-based telecommunications system, for example. System interface layer 16 is comprised of operating system (OS) API and the network links. System interface layer 16 defines the functions of process and thread management, memory management, timers, file system, communication, interface to hardware devices, and other system components. Telecom platform 10 allows higher level client applications 12 to be decoupled from the operating system and network. By using telecom platform 10, developers may write applications without having to master the intricacies of the underlying services, such as the operating system and the network, that perform the work on behalf of the application.

Figure 2:
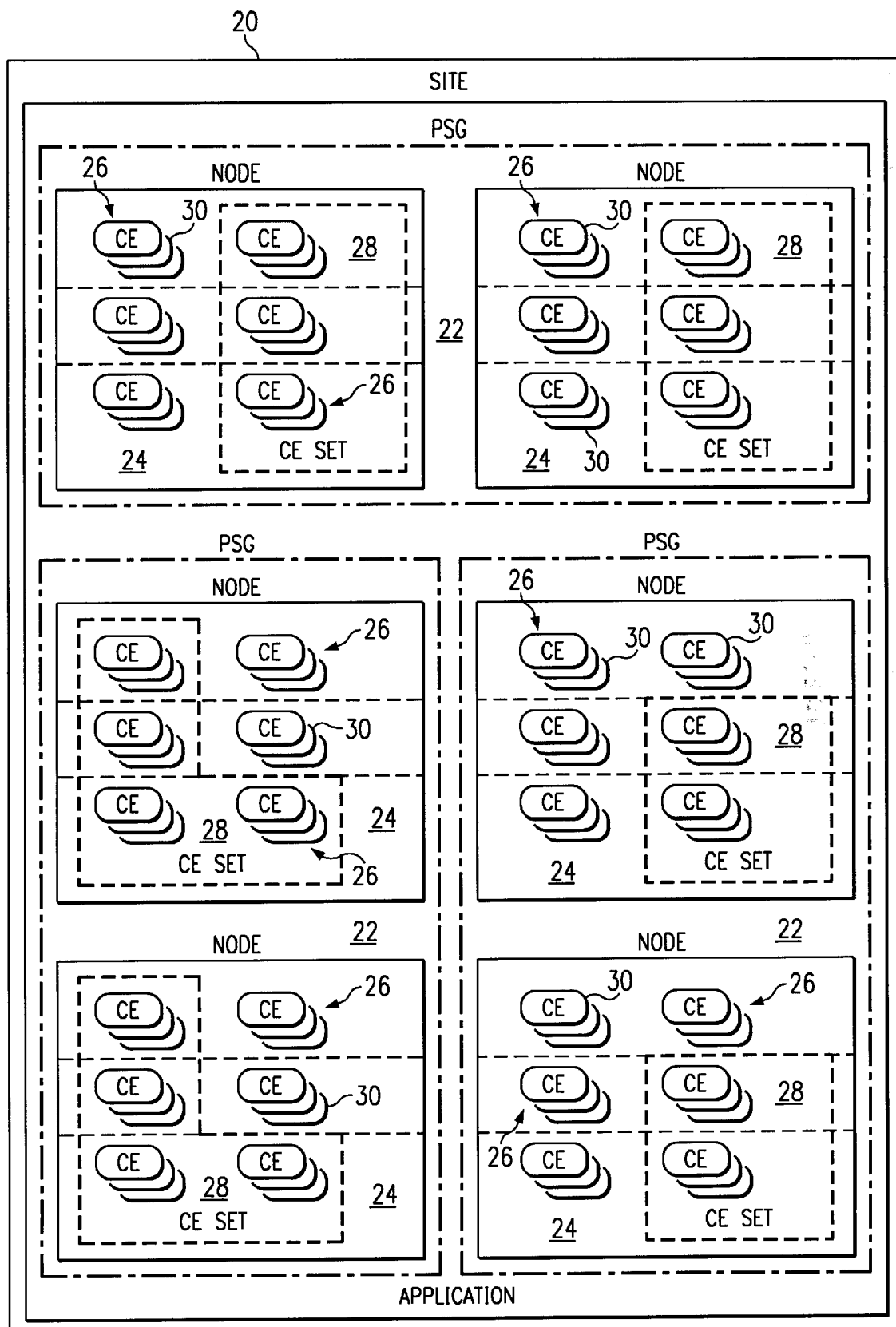
FIG. 2 is a simplified block diagram of the telecom platform conceptual components according to an embodiment of the present invention.

FIG. 2 is a block diagram of the conceptual components associated with telecom platform 10. The smallest conceptual component is a configurable element (CE) 30. A configurable element 30 is defined by telecom platform 10 as one or more copies of a UNIX executable program that is administered by telecom platform 10. For example, a configurable element may be a link process, database, graphical user interface, timing process, query process, error handlers, etc. Configurable elements 30 are the fundamental building blocks of application programs. The most basic services that telecom platform 10 provides to application developers are those service to create, configure, and monitor configurable elements 30. Configurable elements 30 can be configured to be started at specific points during node initialization. The Unix executable configurable elements represent can be run multiple times for scalability or redundancy. Thresholds of the number of instances of configurable elements required to provide adequate services can be configured as well as whether or not the instances should be restarted automatically by the telecom platform 10 in the event of a process failure.

Configurable attributes of a configurable element includes RunLevel, which is the level a configurable element starts at. The RunLevels include PRE_MIN, OS_MIN, IN_SVC, and POST_IN_SVC. PRE_MIN run level specifies that the configurable element will be created automatically by a service management subsystem at boot time. PRE_MIN configurable elements are not monitored by the platform manager subsystem. OS_MIN specifies that the configurable element will be created when the node is transitioning to OS_MIN. IN_SVC specifies that the configurable element will be created when the node is transitioning to IN_SVC. POST_IN_SVC specifies that the configurable element will be created when the node transitions to the IN_SVC state. Another configurable attribute is NumberOfInstances, which specifies how many copies of the executable is to be run. InServiceThreshold is a configurable attribute that specifies how many out of NumberOfInstances is required to be up and running to make the configurable element's state be ENABLED. If the number of instances drop below this threshold, the entire configurable element or all the instances of the configurable element are removed. Another attribute of the configurable element is the HeartbeatSchedule which specifies the schedule for heartbeat messages to be sent to a configurable element. Each configurable element also has an AuditSchedule, which specifies the schedule for audit messages to be sent to the configurable element.

A configurable element set (CESet) 26 is defined by telecom platform 10 as a group of configurable elements designed to be deployed together on one or more nodes 24. A configurable element set is a distributable component. Telecom platform 10 may not manage configurable element sets 26 directly, but does support their creation and deployment. Configurable element sets 26 can be viewed as being the distributable and/or replicable components of an application 28.

An application 28 is defined as a group of configurable element sets 26 that fully define all of the configurable elements 30 of a distributed program. Telecom platform 10 provides software to manage applications 28 within a site 20. Defining the configuration of applications in terms of their distributable components allows the software for a distributed application to be defined independently of the hardware on which it will be run. An application's configurable element sets will at some point in time be deployed to the nodes 24 of a site 20. When that occurs the scale and fault resilience of the application 28 will be determined based on the number of nodes used to support each configurable element set.

A node 24 is defined as an instance of a supported operating system on which telecom platform 10 runs. Telecom platform 10 provides software that manages processes on nodes 24. Nodes 24 may be fault tolerant or non-fault tolerant, single or multi-processor. Telecom platform 10 uses the services of the operating system and is generally unaware of the hardware it is running on. Telecom platform requires very little configuration information for a node 24. Nodes are configured into the system by providing their name and unique device identifiers.

Nodes 24 have operating states, supported by telecom platform, that describe the ordering of configurable elements started within them. The operating states includes HALTED, PRE_MIN, OS$_{\_1 MIN, IN}$_SVC, and POST_IN_SVC. The HALTED node state indicates that the operating system of the node has been shut down. The PRE_MIN state is used to start configurable elements that need to be started before configurable elements in the OS_MIN states are started. Telecom platform starts all configurable elements that are configured to run at PRE_MIN for that node first, then immediately begins running configurable elements that are configured to run in the OS_MIN state. Configurable elements that are configured to run at PRE_MIN do not directly effect the state of the node. The OS_MI node state coordinates all configurable elements configured for the OS_MIN run level will be started to bring the node to the OS_MIN state. All configurable elements configured for the OS_MIN node state achieve their configurable run-level transition state before the node is said to have transitioned to OS_MIN. Once the OS_MIN node state has been achieved, if any configurable element changes its state to be below its run-level transition state, the telecom platform will downgrade the node to the HALTED node state. A shut down node may recover automatically. The IN_SRV node state coordinates configurable elements configured for the IN_SRV run-level. All configurable elements configured for the IN_SRV node state achieve their configurable run-level transition state before the node is to have transitioned to IN_SRV. Once the IN_SRV node state has been achieved, if any configurable element changes its state to be below its run-level transition state, the telecom platform will downgrade the node to the OS_MIN node state. Automatic recovery of a node may occur if the node downgrade was not originated manually. The POST_IN_SRV node state is used to configure configurable elements that are to be started immediately after a node has transitioned to IN_SRV. Once a node has achieved IN_SRV, the telecom platform creates each POST_IN_SRV configurable element. State changes for POST_IN_SRV configurable elements do not affect node state, and may be started and stopped repeatedly. The process of stopping a POST_IN_SRV configurable element does not cause the node to downgrade to a lower node state.

A site 20 is defined by the telecom platform to be a group of nodes that distributed applications can be deployed across. Telecom platform provides a telecom platform application known as the platform manager that manages nodes 24 within a site 20. A site may be made up of at least one node. In multi-node sites, the platform manager application may run as an active/standby distributed application in two of the nodes. In single node sites, the platform manager application runs in the single node along with user defined applications, but runs without the fault handling capabilities provided by a standby node. Administration of a site is provided through the platform manager.

A processor service group (PSG) 22 is defined as a group of nodes that a specific configurable element set 26 is deployed to for redundancy. Telecom platform 10 provides software applications to manager processor service groups within an application. Processor service groups support redundancy by allowing the telecom platform user to identify the number of nodes a configurable element set is required to run on to provide an adequate level of service. As the state of the nodes or the configurable element sets running on them change, telecom platform 10 verifies that the appropriate level of service is maintained or it will change the application status as configured.

Figure 3:
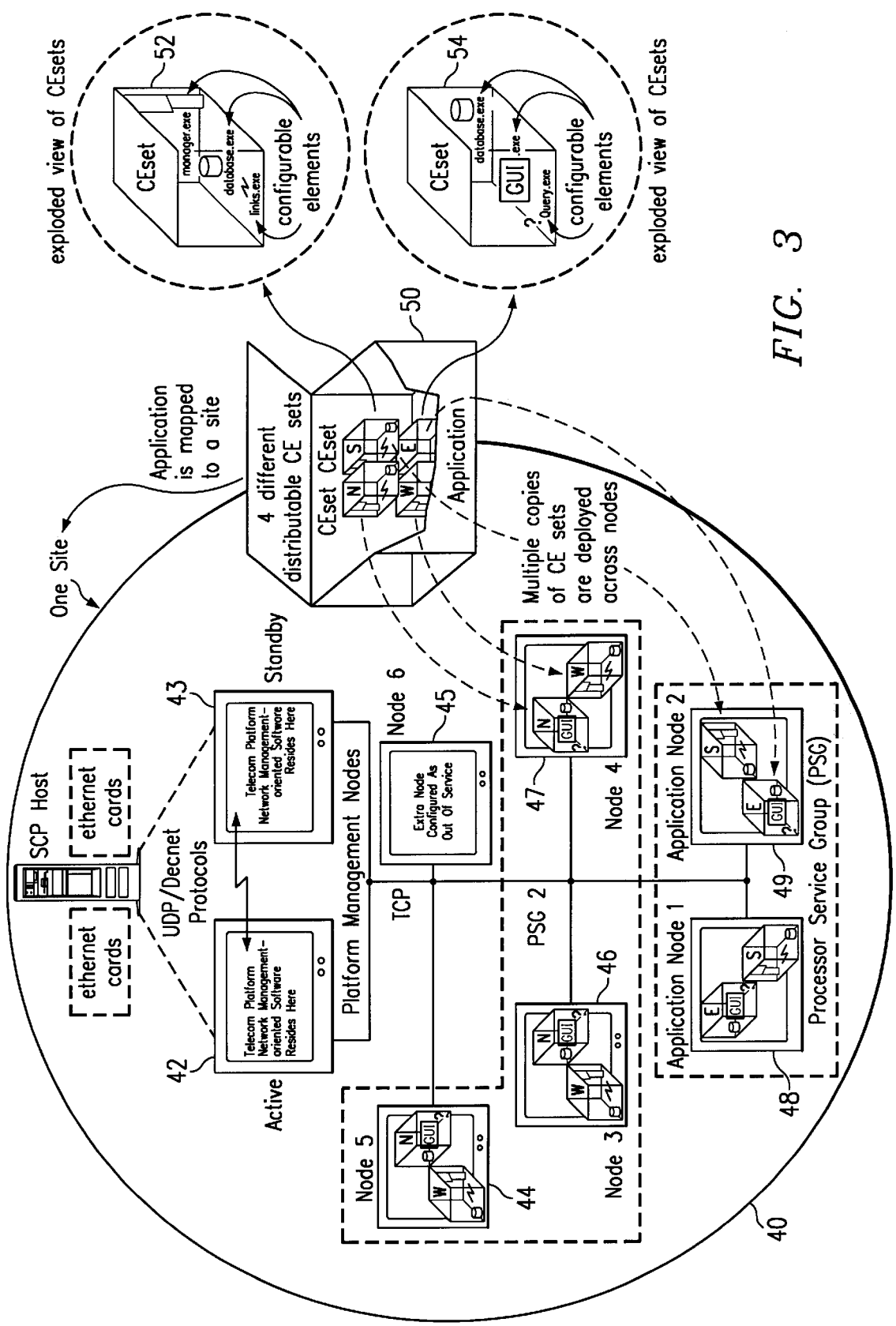
FIG. 3 is a block diagram of telecom platform's conceptual components and relationships therebetween according to an embodiment of the present invention.

FIG. 3 is a diagram illustrating a system 40 design employing the conceptual components of telecom platform 10 which are mapped onto hardware components.

In terms of hardware configuration, a node is a computer processor within a network (such as ethernet) that can act either as a client or a server. Each node has a single instance of the operating system running on it. The processors within a node cannot run independently from one another because of their dependence on the operating system. Each node at a site can be classified as a platform manager or an application node. A site can consist of one node or a grouping of nodes that are connected to a host. The platform manager node has a redundant mate. The platform manager node and its mate may operate in an active/standby mode or a load-sharing mode.

System 40 has eight nodes, which includes two platform manager nodes (active 42 and standby 43) and six application nodes 44–49. An application 50 for handling telephone calls based on the time the call is placed, or time dependent routing, is deployed across the nodes. Configurable element sets 52 and 54 of application 50 are the distributed components which supply the time dependent routing functionality. Each configurable element set 52 and 54 contain the software processes of the UNIX executable programs or configurable elements for a specific time zone. As shown, application 50 does not have to reside on a single application node 44–49. It may be desirable to map configurable element sets onto different nodes. This makes it possible to scale the application by increasing the number of nodes to which the configurable element sets are configured.

Figure 4:
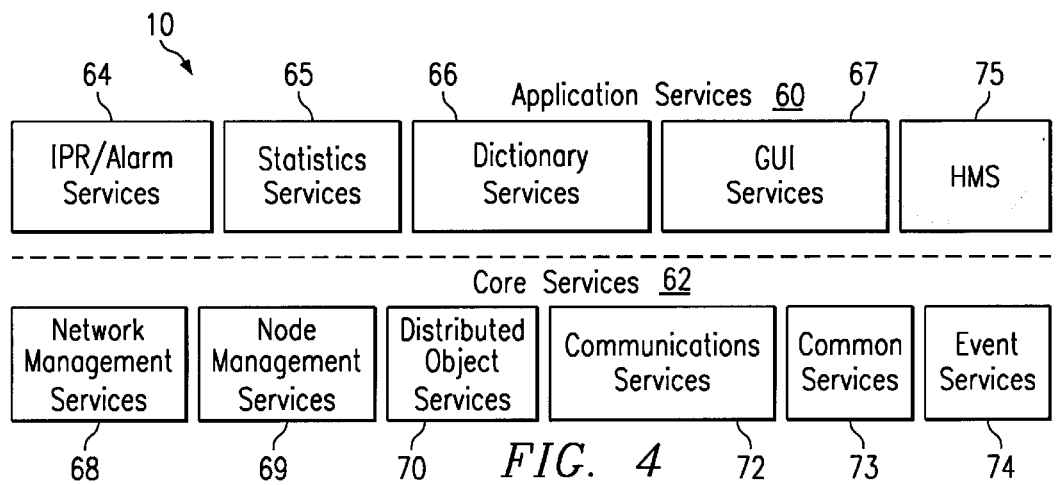
FIG. 4 is a simplified block diagram of the logical partitioning of the telecom platform according to an embodiment of the present invention.

The telecom platform internal architecture is described from both the logical and physical partitioning perspectives. The logical partitioning decomposes the telecom platform into distinct functional areas as shown in FIG. 4. Each functional area contains a cohesive group of classes, which together provide one particular system function. The physical partitioning describes the concrete software and hardware decomposition of the system's context. The services provided by telecom platform 10 may be partitioned into two groups: application services 60 and core services 62. Application services may include services that perform information and problem report (IPR)/alarm 64, statistics 65, dictionary 66, graphical user interface (GUI) 67, and host maintenance simulator (HMS). IPR/alarm services 64 provide a standard mechanism to inform the system user of error conditions and other pertinent system information. Statistics services 65 provides the methods to access system-wide measurement data and to generate reports based on the collected data. Dictionary services 66 provide classes that are designed to support data storage (persistent, shared or private) and access to the data. Graphical user interface services 67 provide primitive abstractions for building GUI applications, and access to system utilities and to the system itself, e.g., xterm window and operating system utility programs. Host maintenance simulator services 75 provide a method of interfacing with the telecom platform when there is only one node within the system or when there is not a host to which to connect. It is through the host that control and operation of the platform is made possible.

Core services 62 may include services that perform network management 68, node management 69, distributed object 70, communications 72, common functions 73, and event handling 74. Network management services 68 directs network activities, e.g., configuration of nodes and network-level fault processing. Node management services 69 directs node-level processes, e.g., node status reporting and link management. Distributed object services 70 provide a distributed database repository for object-based communication in a multi-processing environment. Communications services 72 provide the mechanism for handling messages across interprocessing links external to the platform. Common services 73 provide a library of programming tools to aid in the rapid development of processes designed to run on or within the telecom platform. Event services 74 provide the capability to initiate, terminate, and/or distribute specific actions significant to a task.

As a minimum, telecom platform provides all of the core services. High level applications use these services to accomplish the lower level functions.

Figure 5:
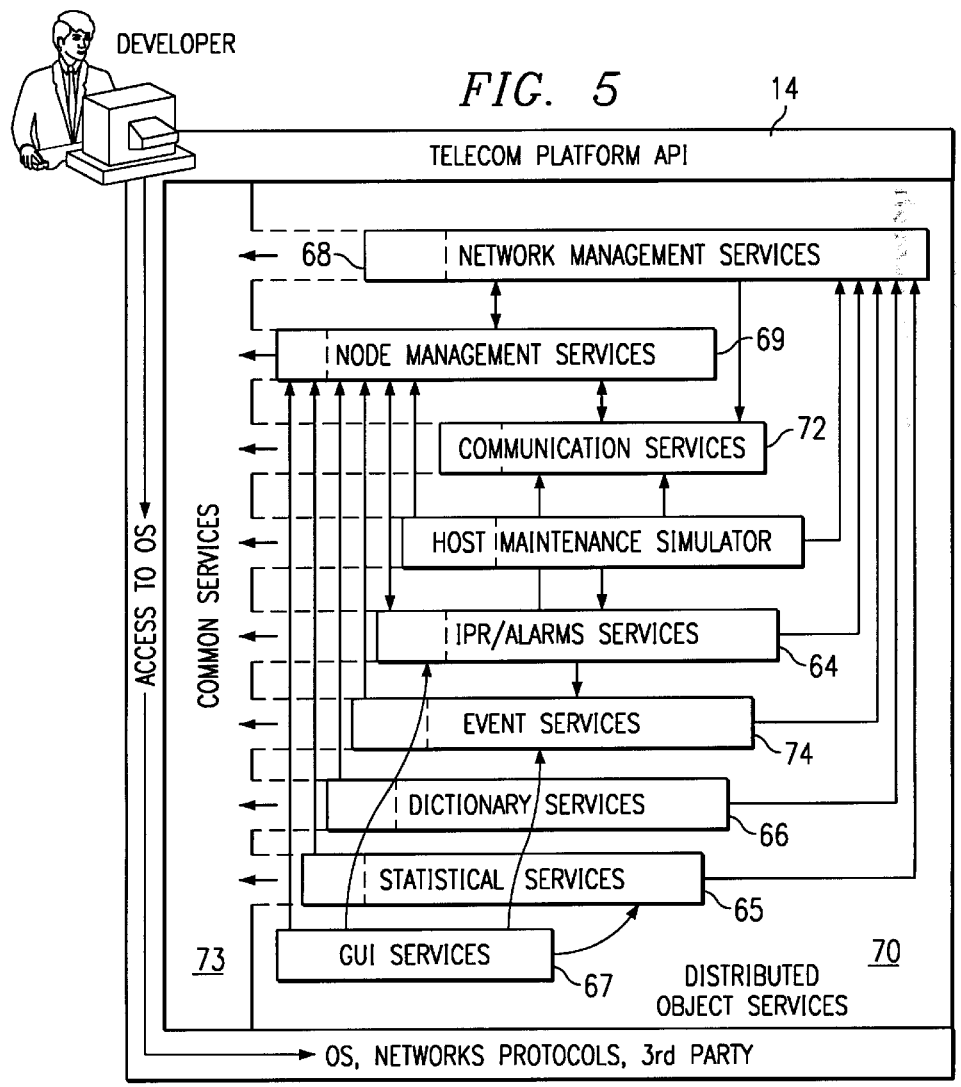
FIG. 5 is a simplified block diagram of the telecom platform services and their dependencies according to an embodiment of the present invention.

FIG. 5 further shows the telecom platform services and their dependencies. The developer accesses all of the core and application services through telecom platform application program interfaces 14. The developer may also access the operation system, network, and third party software/hardware if the need arises. Interprocess object-based communication is handled by communication services 72. Most of the core and application services dependent on communication services 72 and common services 73 to perform their respective functions. Graphical user interface services 67 may only be dependent on communication services 72. The arrows in FIG. 5 indicate the dependency relationships between the services.

Figure 6:
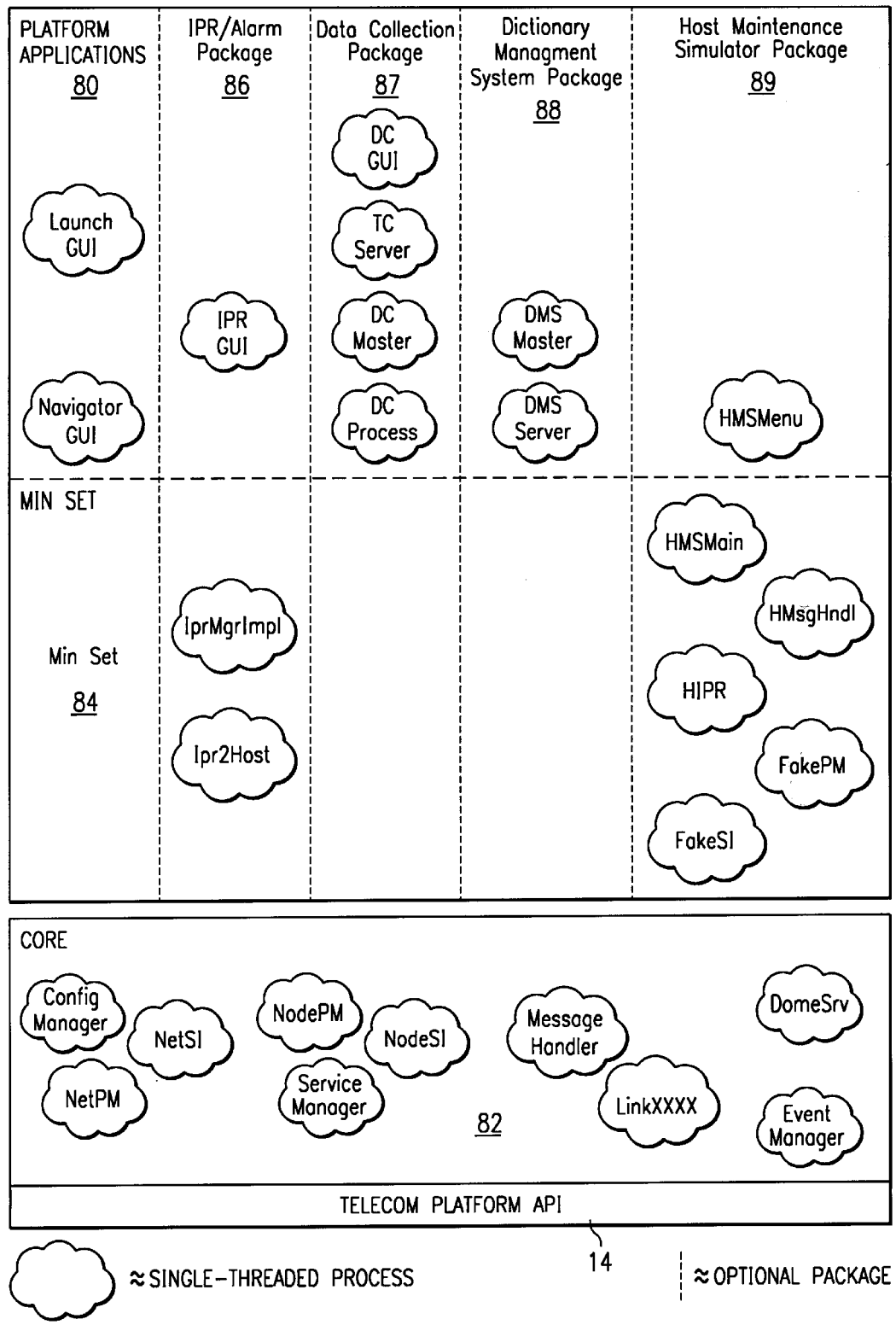
FIG. 6 is a simplified block diagram of the physical partitioning of the telecom platform according to an embodiment of the present invention.

FIG. 6 is a diagram of the physical partitioning of telecom platform 10 which includes an application layer 80 and a core layer 82. Core layer 82 containing core services 62 exists for every instance of a telecom platform. Core layer 82 contains telecom platform API 14, interprocess communication mechanisms, event mechanisms, and platform management. Telecom platform applications layer 80 has both vertical and horizontal partitions. Vertically, each telecom platform application process is classified as either a part of a main set of applications 84 or not. Non-main set processes are dependent on the main set processes. Horizontally, telecom platform applications 80 are categorized as required or optional. Optional applications may include an IPR/alarm package 86, a data collection package 87, a dictionary management system package 88, and a host maintenance simulation package 89.

The following is a more detailed description of Telecom platform services.

Network Management Services

Figure 7A:
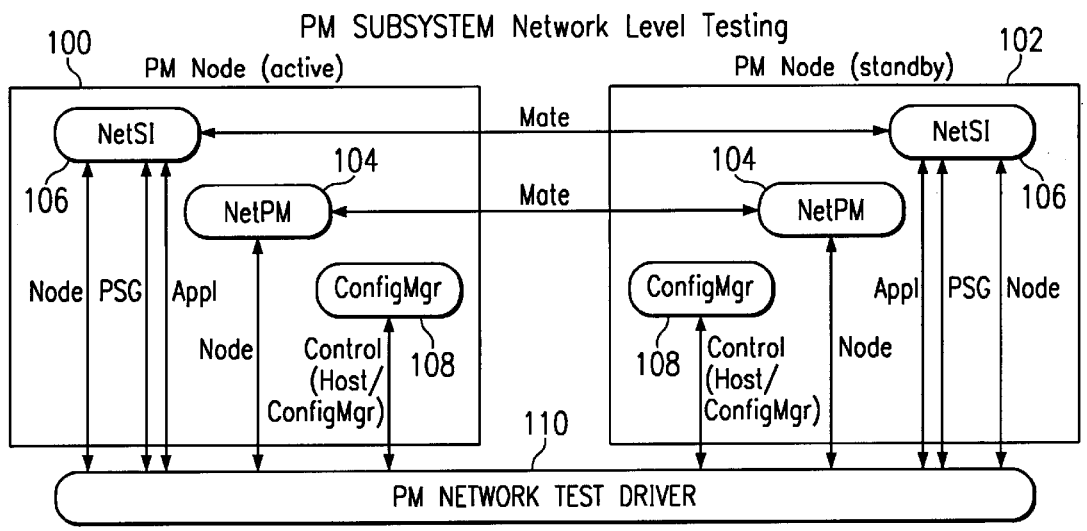
FIG. 7A is a block diagram of NetPM's testing flow according to an embodiment of the present invention.

Network Management services 68 provides a common administrative view of the network element. It is responsible for implementing high level operations on the network element nodes such as removing server nodes from service, restoring server nodes to service, removing applications from service, restoring applications from service, enabling or disabling applications, maintaining status of distributed applications, maintaining server node state and status, and reporting application status changes. Network management services 68 includes a network platform manager (NetPM), network system integrity subsystem (NetSI), and configuration manager (ConfigMgr). FIG. 7A is a block diagram showing an active platform manager node 100 with a corresponding or mated standby platform manager node 102. Each platform manager node includes a network platform manager 104, a network system integrity subsystem 106, and a configuration manager 108. A platform manager network test driver 110 provides network level testing.

Network Platform Manager (NetPMMain)

The class name for the network platform manager is NetPM. NetPM is responsible for providing management functionality of the platform resources. The platform is a distributed system consisting of multiple nodes or servers which provide processing power for specific services, such as calling card or credit card validation. The service provided by a server is determined by the configurable elements residing on the node. NetPM manages all the configuration data associated with the platform. Configuration data includes information about the hardware, such as the TCP/IP address of a server, status information, such as server and query status, software configuration information, such as application type, node name, and information relating to the individual configurable elements.

NetPM maintains the following configuration information. This information is collected by NetPM during its initialization.

Configurable element descriptor information—This provides configuration information for each Configurable element of the platform. NetPM retrieves these from a disk file containing the information on configurable elements of different types.

Application information—This provides configuration information about each application (service), which can be used in calculating an application's status. NetPM retrieves this information from a disk file containing the information for all the applications in the platform.

Processor service group information—This provides configuration information about Processor service groups, which can be used in calculating the Processor service group status (Processor service group designates group of processors serving the same application, i.e., CCD, CCL). NetPM retrieves these from a disk file containing the information for all Processor service groups in the platform.

Server information—This provides specific information about all servers in the platform. NetPM requests and retrieves this information from the ConfigMgr. ConfigMgr provides NetPM with the server information on platform manager nodes first. Afterwards if ConfigMgr determines that the current server is the active platform manager, it provides the local NetPM with the information on the remaining servers in the platform. Otherwise (standby platform manager), NetPM will retrieve those information from its mate, and not from the ConfigMgr.

If an error is detected while collecting these information, NetPM issues appropriate IPRs and exits.

NetPM uses a NetMAP object to manage all the configuration data. NetPM also uses a persistent dictionary to retain server status, query status, and scheduled actions information across platform manager resets. A Disk File Dictionary object is used to manager this dictionary. NetPM is responsible for maintaining the integrity of the configuration data between the two platform manager servers. NetPM uses a persistent dictionary, database equalization, and auditing to maintain the integrity of the data.

Application status is determined based on the processor service group status. The following criteria is used in determination of the processor service group status:

PSG_DISABLED—At least a set number of servers in the processor service group are in disabled state.

PSG_INACTIVE—At least one server in each processor service group is in standby state, and none is in active state.

PSG_ACTIVE_MINIMAL—Only certain number of servers in the processor service group are in active state.

PSG_ACTIVE—A set number of servers in the processor service group are in active state (Note: This number will be greater than the number of servers that need to be active for PSG_ACTIVE_MINIMAL.)

and the application status may be derived using the following criteria:

AP_DISABLED—At least a set number of processor service groups for the given application have status of PSG_DISABLED.

AP_INACTIVE—At least one processor service group for the given application has status of PSG_INACTIVE, and no processor service group has status of PSG_ACTIVE.

AP_ACTIVE_MINIMAL—A set number of processor service groups for the given application have status of PSG_ACTIVE_MINIMAL or higher (PSG_ACTIVE).

AP_ACTIVE_PARTIAL—A set number of processor service groups for the given application have status of PSG_ACTIVE_MINIMAL or higher (PSG_ACTIVE) (NOTE: The number of processor service groups required for AP_ACTIVE_PARTIAL state is greater than required number of processor service groups for AP_ACTIVE_MINIMAL).

AP_ACTIVE—A set number of processor service groups for the given application have status of PSG_ACTIVE (NOTE: The number of processor service groups required for AP_ACTIVE stat is greater than required number of processor service groups for AP_ACTIVE_PARTIAL).

NetPM keeps track of the status changes on each server node, and as it gets them it determines the status of the processor service group and in case of a change, determines the new application status for the node, and informs ConfigMgr of these changes.

NetPM provides solicited and autonomous updates on application status. For autonomous updates, the application process first registers a function with NetPM to receive updates for a particular application type (CCD or CCL). Whenever NetPM receives a change of server or query status from NodePM, the application status is calculated and the registered function is called with the old and new application statuses. Application status can also be solicited, during which NetPM will return the latest calculated value of application status saved in its NetMAP to the requesting process.

NetPM provides, partially through the use of two alias objects, two sets of routing options to other processes wishing to communicate with NetPM. NetPM provides a local, and a global active-standby option. In the local option, all NetPM client requests are sent to the NetPM server object in the same node as the client object. In the global active-standby option, all NetPM client requests are sent to the globally (i.e. possibly inter-nodal) available active NetPM server object.

NetPM provides a set of reader, and writer, functions for a lot of the Server configuration data. These include reader/writers for the schedule action data, the platform manager active status data, the server status data, etc. NetPM provides no direct read/write operations for the configurable element description data.

NetPM also provides a function to initialize the majority of the Server configuration data. This function expects a ServerInfoMsg object as input.

NetPM provides a set of functions which cause a specific configuration action (such as graceful halt, immediate halt, graceful downgrade, and restore), to occur on a specific Server.

NetPM provides a function where the server status can be changed on a specific server.

NetPM provides a function to enable, and a function to disable the query processing on a specific server.

NetPM provides several functions which "report" server status, and query status changes. These routines save the new status information in NetMAP, notify the ConfigMgr software of the change, and broadcast the change to all the NodePM software in the platform.

Figure 7B:
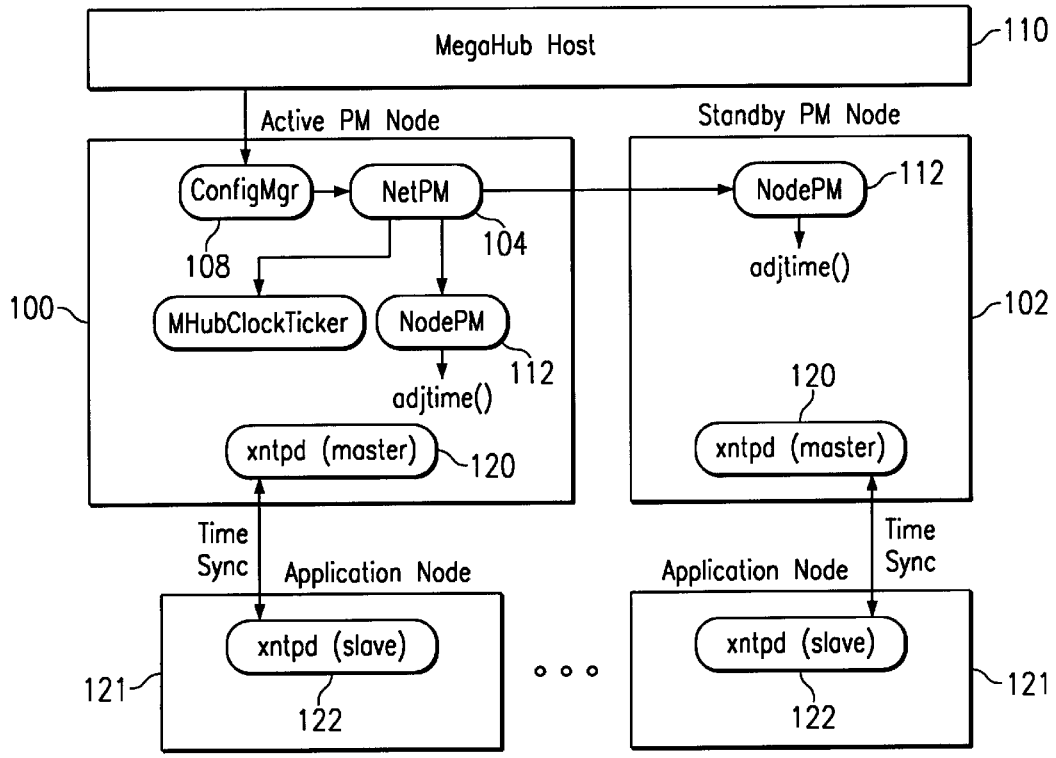
FIG. 7B is a block diagram of NetPM's time synchronization flow according to an embodiment of the present invention.

NetPM is also responsible for time synchronization within the server network. Time synchronization consists of three major parts, as shown in FIG. 7B. The first part is for active platform manager 100 to equalize its local time with the time of the host. This includes converting the host's (110) time into a usable form and informing the NodePMs 112 on platform manager nodes 100 and 102 to perform an adjtime( ) function to adjust their clocks in line with host 110. NetPM 104 also informs the host ticker class of the new host time when it receives the time message. An xntp process 120 then synchronizes the application nodes' (121) time with the time of the platform manager nodes 100 and 102. Each of the platform manager nodes 100 and 102 are configured as xntp master sources of time. The xntp daemon slaves 122 on application nodes 121 choose one of the master xntp daemons 120 on platform manager nodes 100 and 102 to keep in synch with. Finally, whenever an unsolicited Set Time message is received from host 110, the network's time is the same as the received time.

Lastly, NetPM 104 provides a function which provides a newly booted node with pertinent server configuration data of all the servers in the platform. NetPM 104 is a configurable element. NetPM 104 provides the unencapsulated operations: Remove, Restore, and GetStatus which NodePM requires to control NetPM's execution. NetPMTimerHandler is called when the audit timer fires. It aborts the provide service loop and calls the NetPM function SettimeToVerify to start the audit.

NetPM 104 is an object with its own thread of control. After building up its NetMAP lists, NetPM 104 goes into an infinite loop waiting for requests. NetPM 104 notifies ConfigMgr 108 whenever there is a change in the service or query status of a server. NetPM 104 also sends these status changes to all the NodePMs 112 in the platform. NetPM 104 notifies the specific NodePM 112 to enable, or disable, query processing. NetPM 104 provides service status synchronization functionality. NetPM 104 builds up the IPU information for the servers in the platform and passes this information to the specific NodePM 112 in the BootNotify member function. NetPM, in all the configuration requests for degradation of service (i.e. GraceDown, ImmedDown, GraceHalt, and ImmedHalt), notifies the specific NodePM 112 of the desired state of the server. NetPM 104 does several things when a server restore is requested. First, NetPM 104 obtains the current status of the server from the specific NodePM 112. Second, if the returned status is out-of-service/minimum-software, NetPM 104 sends the specific NodePM 112 the relevant NodeSpecInfo. Third, NetPM 104 sends the relevant configurable element descriptor information to the specific NodePM 112. Lastly, NetPM tells the specific NodePM to restore to service.

Network System Integrity (NetSIMain)

The Network System Integrity (NetSI) subsystem 106 provides monitoring and recovery operations for the network element. It is responsible for implementing network monitoring and recovery. Operations implemented by Network System Integrity include:

platform manager active/standby status monitoring node failure report correlation failed node recovery actions The class name of Network System Integrity is NetSI. NetSI 106 manages network system integrity for the platform manager. NetSI 106 receives notifications of server downgrades and communication faults from the NodeSI on the faulted node. NetSI 106 determines what action should be taken based on the data given by NodeSI. If the node indicates a downgrade, NetSI will take the appropriate action to downgrade the node from the network level to the desired downgraded state. If the node indicates a communication fault, NetSI 106 will determine what node (if any) is at fault from data received previously and will take action to downgrade the faulted node if necessary. When NetSI determines that a downgrade is required for a node, NetSI calls the appropriate NetPM operation to perform the downgrade. If a change in active status is required, NetSI calls the appropriate NetPM operation to set the active status. After NetPM is called to perform the downgrade, NetSI notifies ConfigMgr that the status is changing for a particular node. This allows the host to be informed immediately that a node is being downgraded. NetSI then writes an entry to the network configuration report indicating the status change and reason for it. NetSI downgrades nodes to the legal service state based on the current state of the node.

NetSI contains a communication fault list. This list holds the reporting server node name and problem server node name of each communication fault report received. When a communication fault report is received, the list is searched for another report about the problem node. If not found, the fault information is added to the list. NetSI also contains a down status info list. When NodePM indicates that a node is out of service and the NetPM status does not indicate the node is halted, a down status info entry is created with the node name of the halted IPU. A timer is created and the down status info is added to the list. If NodePM later indicates a higher status for that node (before the timer expires), the down status info entry is cleared from the list and no further action is taken.

NetSI routinely audits the status conditions of both PMs. If invalid conditions are present, NetSI attempts to correct the situation by setting the active status to the correct state. Other processes can also request NetSI to audit the platform manager status conditions.

NetSI operates with a "send to both" load shared concept. If both platform manager nodes are operational, each NetSI process on each platform manager node will receive the NodeSI request. Each NetSI process will determine if it should handle the request based on the platform's active/standby state and faulted server. The active platform manager's NetSI process will usually take the required action while the standby platform manager discards the information. However, if the faulted node is the active platform manager, the standby platform manager(if valid) will set itself to active and take the request action to downgrade the other platform manager node.

Each time a NetSI operation is called, NetSI first determines if it is the active or standby platform manager. If active, NetSI will process the request for all conditions except when the target node is itself and the mate is in service. If in standby, NetSI will discard the request for all conditions expect when the target node is the mate.

During initialization NetSI requests the mate's node name and server descriptors of its own server and mate server from NodePM. Before requesting the information, NetSI polls for the status of NodePM, and will not request the node name and server descriptors until NodePM is read to provide them. NetSI will not be ready to provide service until this information is received properly.

NetSI uses the command line parameter DWN_RPT_FILE to get the name of the network configuration (downgrade) report file name. If this parameter is not specified, no report entry is made of the downgrades.

Figure 7C:
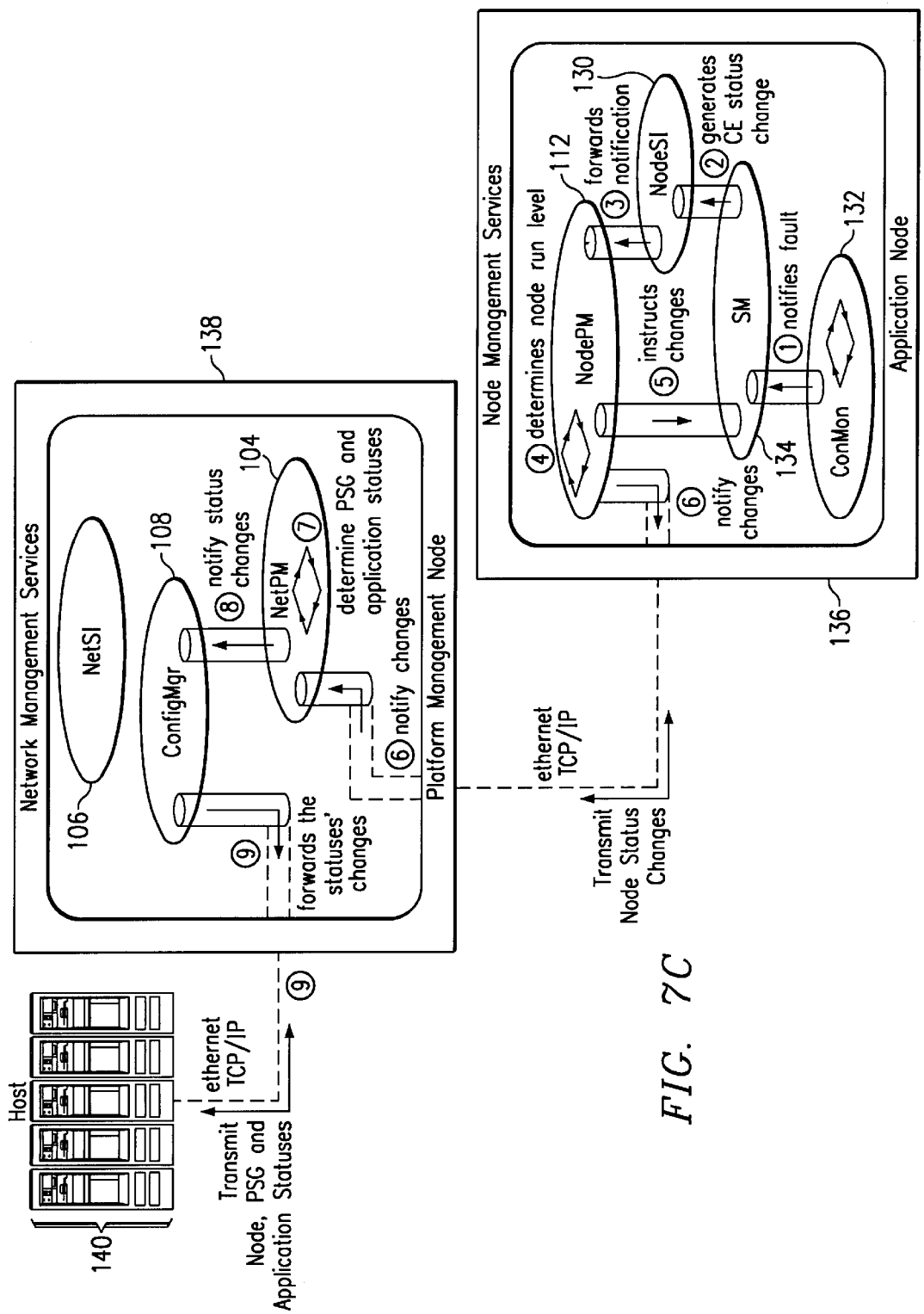
FIG. 7C is a block diagram showing fault detection and interaction between network management services and node management services according to an embodiment of the present invention.
Figure 7D:
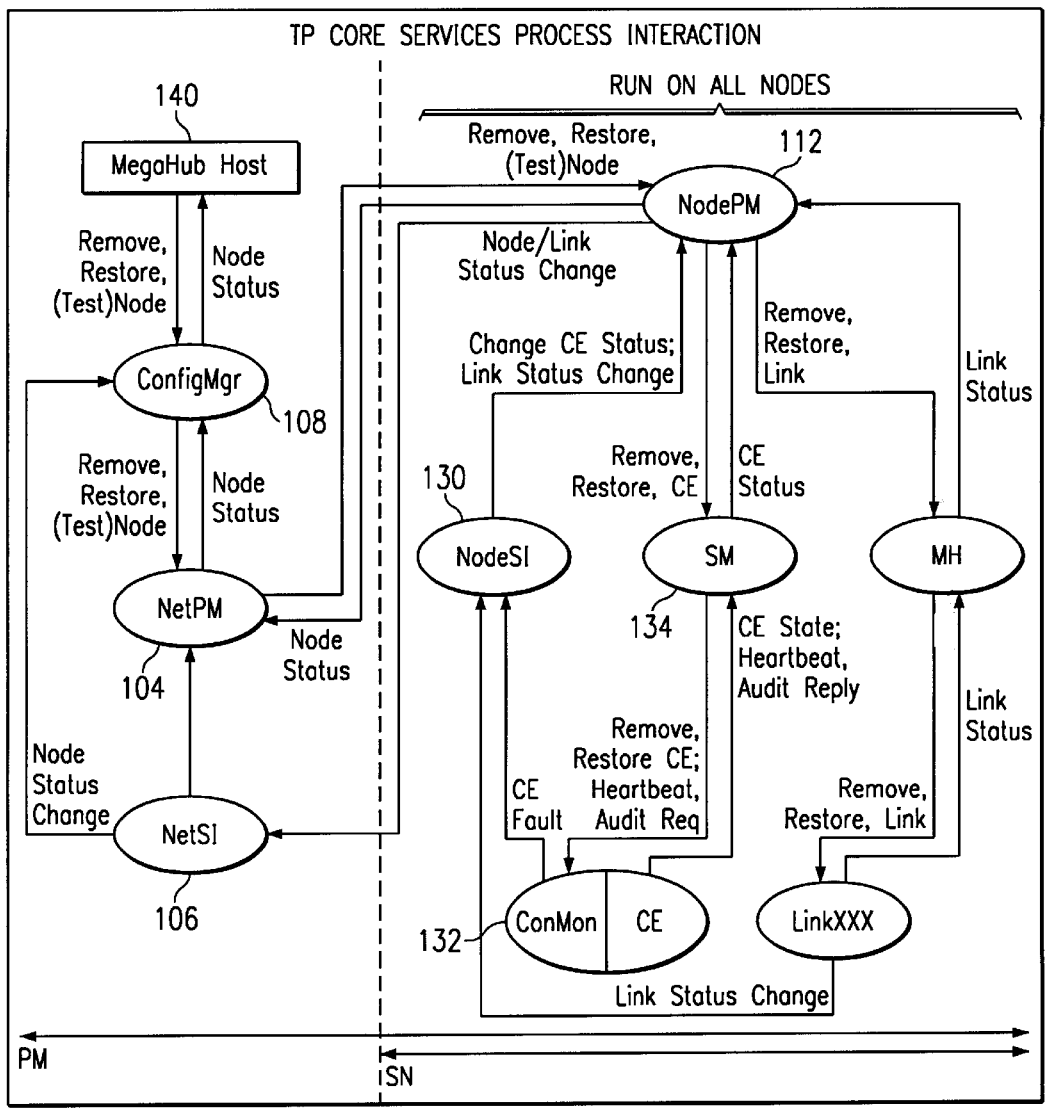
FIG. 7D is a block diagram showing interaction between core services according to an embodiment of the present invention.

Referring to FIGS. 7C and 7D, process interaction between node management and network management is shown. Constant monitor (ConMon) 132 is an instance of an object running on an application node 136. ConMon 132 detects a faulted process or a failed configurable element, it notifies a service management process program 134. Service management process 134 determines if the configurable element failure causes the process to fall below its threshold level. If it does not, the service management process 134 restarts the configurable element. However, if the configurable element does fall below its threshold level then service management process 134 generates a configurable element status change message and forwards the notification to NodeSI 130. NodeSI forwards the configurable element status change to NodePM 112. NodePM 112 determines whether the configurable status change affects the run level of the node, which could cause a downgrade of the node. If the node is to be removed, NodePM 112 provides instructions to service management process 134 to remove all of the configurable elements necessary to achieve the downgraded state. NodePM 134 notified the NetPM 104 of the node status change. NetPM 104 performs a calculation to determine if the node status change affects the processor service group and application status. NetPM's calculation also determines if an auto-action, such as removing a node from in-service to min-set and restoring it again, should be performed on the node. If the node is to be removed, then the node status change is forwarded from NetPM to ConfigMgr 108. ConfigMgr notifies host 140 of the state change for the node, processor service group, and application. These state changes can be displayed or printed in a report.

In particular, each NetSI determines if it should handle the downgrade request. If so, the target server's status is retrieved. If the target server is not already halted, the server is downgraded to the appropriate status based on the IPU status. If the IPU status is out of service, NetSI calls NetPM's immediate halt operation to either auto halt or manually halt the target node. If the IPU status is Out of service minimal (OS-MIN), NetSI calls NetPM's immediate downgrade operation to downgrade the target node to OS-MIN. If the IPU status is in service disabled, NetSI calls NetPM's disable query operation to disable query status for the target node. In all cases, NetsSI updates the active status if the target node is the active platform manager. Also, if the target node is part of the local site, NetSI informs the host via ConfigMgr that a status change is occurring and initiates recovery of the processor service group (through ConfigMgr) if it determines that the processor service group of the target server should be recovered. NetSI then writes an entry to the network configuration report file indicating the status change is occurring due to the node reporting a fault.

NodeSI informs NetSI of communication faults that occur between two nodes. NetSI stores or takes action on the fault based on previous information receive (if any). Each NetSI determines the status of the reporting and problem nodes. If either server is halted, the communication fault report is discarded since the integrity of the data cannot be assured. If neither server is halted, the Communication Fault List is searched for another report on the problem node. If no report on the problem node is found, a Communication Fault List entry is added to the List with the server information. If another report of the problem node is found and another reporting server has reported it, the problem server is set up for downgrade processing. Once a decision is made about whether the server should be downgraded, NetSI determines if it should handle it (based on its active state and whether or not the target server is itself.) If it should handle the downgrade, NetSI calls NetPM's Immediate Halt operation to either Auto Halt or Manually Halt the problem node. If the server to be halted is the active PM, NetSI updates the active status accordingly before halting the node. Also, if the target is part of the local site, NetSI informs the Host via ConfigMgr that a status change is occurring and initiates recovery of the Processor service group (through ConfigMgr) if it determines that the Processor service group of the target server should be recovered. NetSI also writes an entry to the network configuration report file indicating the halt is occurring due to a communication fault.

Configuration Manager (ConfigMgr)

The Configuration management subsystem (class name: ConfigMgr) provides the control interface between the SCP Host and Server components. All operations that can be performed on the server network are defined in this interface. The Configuration Management subsystem implements the following features:

Control Message Interface between Host and Servers

State Machine for valid operations

Drives Network Management with requests.

Controls operation timing/timeouts.

ConfigMgr manages server configuration control for the platform manager. ConfigMgr receives Host messages transmitted on the CONFIGCTL, MAINT, APPLCTL and ROUTINGCTL logical links and processes each based on its message id and type. If the Host requires a response or report to be sent, ConfigMgr determines the necessary response and retrieves the necessary report information and sends it back to the Host. ConfigMgr handles the following messages:

APPL_STATUS_MSG
ASPEC_MSG
CONFIGURE_SERVER_MSG
PSG_INFO_$_{1\,MSG}$
PSG_STATUS_MSG
QUERY_PROCESSING_MSG
RESET_SERVER_MSG
ROUTING_INFO_MSG
SCHED_ACTION_CTL_MSG
SERVER_INFO_MSG
SERVER_STATUS_MSG
TEST_SERVER_MSG
TIME_MSG

ConfigMgr also provides operations to the platform manager for retrieving server and time information from the host. It also provides operations to notify the host of server status changes. In processing host command messages, there are times when ConfigMgr must wait for a response from the host or for a status change from a particular server. ConfigMgr uses a non-blocking philosophy in respect to these waits. Instead of stopping and waiting for the event to occur, ConfigMgr saves the desired response or status on a PendingQueue and continues normal processing of another Host message or providing service to a client. When the desired response or status occurs, the appropriate procedure is called to resume processing of the host commanded message. If the desired response does not arrive or desired status does not occur within the specified time limit, a fail procedure is called to clean up processing of the Host commanded message and issue IPRs as needed.

In addition to processing host command messages, ConfigMgr is required to notify the host when a status change occurs. When ConfigMgr is notified of a status change, it checks the status pending queues to determine if it is waiting for the status change to occur. If so, the pending queue success operation is performed. Otherwise, ConfigMgr sends server status messages to the host. In processing host response messages, ConfigMgr checks the host response pending queue (HostPendQueue) to determine if it is waiting for the response. If so, the pending queue success operation is performed. Otherwise, ConfigMgr discards the response message from the Host. When a platform manager node is booted to OS-MIN state, it audits its mate and determines the status of the mate. In the event that no mate platform manager node is present, the mate status is automatically set to halted. Similar audits are done on service server nodes (nodes other than PM) to determine their status.

ConfigMgr has a registration capability where a subsystem can register to provide routing information for a particular application. When the Host requests routing information about an application, ConfigMgr makes a request to the appropriate registered subsystem (if one exists) to provide the routing info.

Configure Server Messages (ConfigServerMsgs) require special processing due to the nature of the services that are performed (i.e. halts, downgrades, restores, and boots). Since host messages are sent to both platform manager servers, care must be taken to assure that only one platform manager node processes the request. This requires checking the server state of the platform manager node and its mate. There are different actions to be taken based on the server stats of the platform manager nodes and whether the ConfigServer request is for a platform manager node, its mate, or a service server. Two finite state machines (PMCfgSvrFSM and SvcCfgSvrFSM) manage all the different state driven actions.

PMCfgSvrFSM is the finite state machine that handles the restores, halts, resyncs, downgrades, and boots for a platform manager application server. This machine processes a request based on whether the request is for itself or its mate, its own status, its mate's status, and the event requested (halt, downgrade, restore, etc.) The platform manager server states checked are: Halted (Auto), Halted (Manual), XOS-MIN, AOS-MIN (Auto), MOS-MIN (Manual), and In-Svc. If In-Svc, the active/standby status is checked to determine if the server is active or standby. Valid events are Restore, Graceful Halt, Immediate Halt, Graceful Downgrade, Immediate Downgrade, Graceful Boot, Immediate Boot, and Host Resync.

The event is important for determining which platform manager node will process the request. If a restore is requested, normally the platform manager node which is being restored will process the restoration (i.e. a platform manager node will restore itself). Processing a restore request a platform manager server that is halted, the halted server's mate (if able) will send a Denial response back to the host. If any Halt, downgrade, or boot is requested for a platform manager node, the platform manager node's mate will process it, unless the mate is halted. When the mate is halted the platform manager node will process the halt, downgrade, or boot for itself. Processing a halt, downgrade, or boot may involve actually performing the requested action or sending a Denial response back to the host. If a halt, downgrade, or boot request is not denied, the host considers the action successful.

When a platform manager node has to process a boot for itself, the platform manager node calls the GraceHalt or ImmedHalt operations (based on Boot type) of NetPM to bring itself into a halted state. Processing is then complete for this node since it is being brought down to a halted state. (The host will initiate the reset and boot of the server.) A force flag is checked when a halt, downgrade, or boot is requested for the last In-Service platform manager node. If the force flag is not set, the request will be denied with a response of "DENIED-LAST AMP". If the force flag is set, the halt, downgrade, or boot will be performed on the last In-Service platform manager node.

If a Host Resync is requested for a platform manager node, the target platform manager server's mate will process the request unless the mate is halted. If the target platform manager server's mate is halted, the platform manager node for resync will process the request. Processing the request involves changing the server status from XOS-MIN to AOS-MIN or MOS-MIN or denying the request if the current status is not XOS-MIN.

SvcCfgSvrFSM is the finite state machine that handles the restores, halts, resyncs, downgrades, and boots for a Service application server. This machine processes a request based on the state of the platform manager node performing the action, the state of the service server being worked on, and the event requested (halt, downgrade, restore, etc.) The service states checked are Halted (auto), Halted (manual), XOS-MIN, AOS-MIN (auto), MOS-MIN (manual), and InSvc. Valid events are Restore, Graceful Halt, Immediate Halt, Graceful Downgrade, Immediate Downgrade, Graceful Boot, Immediate Boot, and Host Resync.

The active platform manager node (OS-MIN or In-Service) will process the configure server request for a Service server. A boot, halt, resync, or downgrade is allowed on a service server as long as one platform manager is at least OS-Min. A restore for a service server is only allowed when at least one platform manager is In-Service. If neither platform manager node is In-Service, the platform manager node that is active will send a DENY-AMP not In-Service response back to the host. If a halt, downgrade, or boot request is not denied, the host considers the action successful.

A force flag is checked when a halt, downgrade, or boot is requested for the last In-Service node of an application. If the force flag is not set, the request will be denied with a response of "DENIED-LAST SERVER IN Processor service group PROCESSING QUERIES". If the force flag is set, the halt, downgrade, or boot will be performed on the last In-Service node of the application.

An Under Configuration flag is checked whenever a configure event (except Immediate Halts) is processed. If the Under Configuration flag is set, the request will be denied with a response of "DENIED-SERVER UNDER CONFIGURATION". ConfigMgr sets and clears the Under Configuration flag during event processing. The other messages (i.e. ServerInfoMsg, ServerStatusMsg, TimeMsg, etc.) do not require finite state machines.

When a restore request is not denied, ConfigMgr sets the UnderConfig flag for the server, sends a ConfigServerMsg "Action Initiated" RESPONSE to the Host, and calls RestoreISV operation of NetPM to restore the server to In-Service. ConfigMgr then suspends restore processing and sets up a Server Status PendingQueue entry for the server to become In-Service. Restore processing will not continue until ConfigMgr is informed that the server status is In-Service or the timer expires. When ConfigMgr is informed of the server status change to In-Service, Restore processing is continued by checking the server query status. If the server's query status is DISABLED_SERVER_OOS and the number of active servers is less than the processor service group active server count, ConfigMgr calls EnableQuery operation of NetPM to enable the server's query status and sets the current query status to Pending. ConfigMgr then sends server status messages to the host informing about server and query status change. A QueryStatus PendigQueue entry is set up for the server's query status to become Enabled. Processing is then suspended until the query status becomes enabled or the timer expires. When ConfigMgr is informed of the query status change to Enabled, Restore processing is continued with the sending of server status messages and clearing of the under configuration flag for the server.

Restore fail processing is initiated if the timer expires before the server status changes to In-Service or the requested server information for the other applications is never received. Fail processing involves gracefully downgrading the server to OS-MIN, issuing an IPR, and clearing the under configuration flag for the server. If the timer expires before the query status changes to Enabled, Restore processing is continued with setting the Query Status to Disabled, gracefully downgrading the server to OS-MIN, sending server status messages, issuing an IPR, and clearing the under configuration flag for the server.

When a Graceful Halt request is not denied, ConfigMgr sets the UnderConfig flag for the server, sends a ConfigServerMsg "Action Initiated" RESPONSE to the Host, and calls GraceHalt operation of NetPM to halt the server. If the node is not already halted, ConfigMgr then suspends halt processing and sets up a Server Status Pending Queue entry for the server to become Halted. It then makes an entry to network configuration report indicating a halt was requested by the host. halt processing will not continue until the ConfigMgr is informed that the server status is Halted or the timer expires. When ConfigMgr is informed of the server status change to a halted state, halt processing is continued with the sending of server status messages and clearing of the under configuration flag for the server. If the timer expires before the server status changes to Halted, Halt fail processing is initiated. Fail processing involves issuing an IPR and clearing the under configuration flag for the server.

When an Immediate Halt request is not denied, ConfigMgr sets the UnderConfig flag for the server, removes all pending server status changes for this server from the status pending queue, and calls ImmedHalt operation of NetPM to halt the server. If the node is not already halted, ConfigMgr suspends halt processing and sets up a Server Status Pending-Queue entry for the server to become Halted. It then makes an entry to the network configuration report indicating a halt was requested by the Host. Halt processing will not continue until the ConfigMgr is informed that the server status is Halted or the timer expires. When ConfigMgr is informed of the server status change to a halted state (or the node is already halted when the halt was issued), halt processing is continued with the sending of server status messages, sending of a ConfigServerMsg "Successfully Completed" RESPONSE to the Host, and clearing of the under configuration flag for the server. If the timer expires before the server status changes to Halted, Halt fail processing is initiated. Fail processing involves issuing an IPR, sending a ConfigServerMsg "Action Failed" RESPONSE to the Host, and clearing the under configuration flag for the server.

When a Graceful Downgrade request is not denied, ConfigMgr sets the UnderConfig flag for the server, sends a ConfigServerMsg "Action Initiated" RESPONSE to the Host, and calls GraceDown operation of NetPM to downgrade the server. If the node is not already at the desired downgraded state, ConfigMgr then suspends downgrade processing and sets up a Server Status PendingQueue entry for the server to become OS-MIN. It then makes an entry to network configuration report indicating a downgrade was requested by the Host. Downgrade processing will not continue until ConfigMgr is informed that the server status is OS-MIN or the timer expires. When ConfigMgr is informed of the server status change to a OS-MIN state (or the node was already at that state), downgrade processing is continued with the sending of server status messages and clearing of the under configuration flag for the server. If the timer expires before the server status changes to a OS-Min state, downgrade fail processing is initiated. Fail processing involves issuing an IPR and clearing the under configuration flag for the server.

When an Immediate Downgrade request is not denied, ConfigMgr sets the UnderConfig flag for the server and calls ImmedDown operation of NetPM to downgrade the server. If the node is not already at the desired downgraded state, ConfigMgr then suspends downgrade processing and sets up a Server Status Pending Queue entry for the server to become OS-MIN. It then makes an entry to network configuration report indicating a downgrade was requested by the Host. Downgrade processing will not continue until ConfigMgr is informed that the server status is OS-MIN or the timer expires. When ConfigMgr is informed of the server status change to a to OS-MIN state (or the node was already at that state), downgrade processing is continued with the sending of server status messages, sending of a ConfigServerMsg "Successfully Completed" RESPONSE to the Host, and clearing of the under configuration Flag for the server.

If the timer expires before the status changes to a OS-MIN state, downgrade fail processing is initiated. Failure processing involves issuing an IPR, sending a ConfigServerMsg "Action Failed" Response to the Host, and clearing the under configuration flag for the server.

When a Graceful or Immediate Boot request is not denied, ConfigMgr sets the UnderConfig flag for the server and sends a ConfigServerMsg "Action Initiated" RESPONSE to the Host. ConfigMgr checks the server status for the server and calls GraceHalt or ImmedHalt operation of NetPM if the server is not at a halted state. If a halt operation is called, processing is suspended until ConfigMgr is informed that the server status is halted or the timer expires. It then makes an entry to network configuration report indicating a boot was requested by the Host.

When ConfigMgr is informed of the server status change to a OS_MIN state (or the node was already at that state), downgrade processing is continued with the sending of server status messages, sending of a ConfigServerMsg "Successfully Completed" RESPONSE to the Host, and clearing of the under configuration flag for the server. If the timer expires before the server status changes to a OS-MIN state, downgrade fail processing is initiated. Fail processing involves issuing an IPR, sending a ConfigServerMsg "Action Failed" RESPONSE to the Host, and clearing the under configuration flag for the server.

When a Graceful or Immediate Boot request is not denied, ConfigMgr sets the UnderConfig flag for the server and sends a ConfigServerMsg "Action Initiated" RESPONSE to the Host. ConfigMgr checks the server status for the server and calls GraceHalt or ImmedHalt operation of NetPM if the server is not at a halted state. If a halt operation is called, processing is suspended until ConfigMgr is informed that the server status is halted or the timer expires. It then makes an entry to network configuration report indicating a boot was requested by the host.

When ConfigMgr has determined that the server is halted, it sends a ResetServerMsg REQUEST to the Host. ConfigMgr creates a Host Response PendingQueue entry to await the ResetServerMsg RESPONSE from the host. Processing is then suspended until the RESPONSE is received or the timer expires. Once the RESPONSE is received, ConfigMgr sets up a ServerStatus Pending Queue entry to await the server status becoming OS-MIN. If the RESPONSE from the Host is not received before the timer expires, an IPR is issued and the under configuration flag is cleared. Once the Server Status becomes OS-MIN, ConfigMgr sends Server status messages to the Host indicating the new server status and clears the under configuration flag. If the timer expires before the server status becomes OS-MIN, ConfigMgr issues an IPR and clears the under configuration flag.

When a Host Resync request is not denied, ConfigMgr determines if the server status is XOX_MIN. If so, SetServerStatus operation of NetPM is called to set the server status to the appropriate Auto/Manual OS_MIN state, server status messages are sent to indicate the new server status, and a ConfigServerMsg "Successful" RESPONSE is sent to the Host. If the server status is not XOS_MIN, an IPR is issued and a ConfigServerMsg "Action Failed" RESPONSE is sent to the Host.

The Application Status Message is processed by the platform manager node that is In-Service Active. If neither platform manager node is In-Service, the platform manager node that is OS-MIN Active will process the request. Upon receiving an ApplStatusMsg REQUEST type messages from the Host, ConfigMgr determines the application query status and sends a ApplStatusMsg S_REPORT back to the Host with the current application query status. ConfigMgr sends ApplStatusMsg U_REPORT type messages to the Host when server status changes occur or as required during processing of a Host configure server request.

ConfigMgr receives an ASPEC Data REQUEST message from the Host for each Application in the ApplsInfo.des descriptor file. ConfigMgr queries NetPM to retrieve the information for that application from the NetMAP. A response message containing the ASPEC Data is sent back to the Host, along with a response code indicating success or failure. IPRs will be issued if there is an invalid Application Id, a message other than the ASPEC Data REQUEST message, or a message type other than request.

The Processor service group Info Message is processed by the platform manager node that is In-Service Active. If neither platform manager node is In-Service, the platform manager node that is OS-MIN Active will process the request. Upon receiving a PSGInfoMsg REQUEST type messages from the Host, ConfigMgr determines the Processor service group Info and sends a PSGInfoMsg S_REPORT back to the Host with the Processor service group information.

The Processor service group Status Message is processed by the platform manager node that is In-Service Active. If neither platform manager node is In-Service, the platform manager node that is OS-MIN Active will process the request. Upon receiving PSGStatusMsg REQUEST type messages from the Host, ConfigMgr determines the Processor service group query status and sends a PSGStatusMsg S_REPORT back to the Host with the current Processor service group query status. ConfigMgr sends PSGStatusMsg U_REPORT type messages to the Host when server status changes occur or as required during processing of a Host configure server request.

The Query Process Message is processed by the platform manager node that is In-Service Active. If neither platform manager node is In-Service, the platform manager node that is OS-MIN Active will process the request. ConfigMgr receives QueryProcMsg DISABLE_SERVER, DISABLE_SERVER_FORCED, and ENABLE_SERVER request types from the Host. Upon processing this message, ConfigMgr initiates the enabling/disabling of query processing for the target server by calling the EnableServer/DisableServer operation from NetPM. ConfigMgr will set up a QueryStatus PendingQueue entry for the server and suspend further processing until the query status for the server changes to the desired state or the timer expires. NetPM informs ConfigMgr of a change in query status by calling the NtfyQryStatChange operation of ConfigMgr. When ConfigMgr processes this operation, it will check the QueryStatus Pending Queue entries for the server query status state. If there is an entry with the desired query status, the appropriate success query processing procedure is called to resume processing of the QueryProcMsg. Success processing for the QueryProcMsg involves sending a QueryProcMsg RESPONSE back to the Host indicating the request was successful and changing the active status if necessary for a platform manager node.

If the timer expires before the server query status is in the desired state, the appropriate fail query processing procedure is called to resume processing of the QueryProcMsg. Fail processing for the QueryProcMsg involves issuing an IPR and sending a QueryProcMsg RESPONSE back to the Host indicating the request failed.

The ConfigMgr sends ResetServerMsg REQUEST type messages during boot processing of a server. When the Host requests a boot for a non-PM server, the ResetServerMsg REQUEST is sent after the target server has been halted. ConfigMgr then suspends boot processing and sets up a Host Response Pending Queue entry for a ResetServerMsg RESPONSE type message. Boot processing will not continue until the RESPONSE is received or the timer expires. When ConfigMgr receives the ResetServerMsg RESPONSE type message from the Host, ConfigMgr will check if there is an entry for the ResetServerMsg RESPONSE in the Host Response Pending Queue entry for a RestServerMsg RESPONSE in the Host Response Pending Queue. If so, the appropriate procedure will be called to complete boot processing.

The Routing Info Message is processed by the platform manager node that is In-Service Active. If neither platform manager node is In-Service, the message will be discarded. Upon receiving a RoutingInfoMsg REQUEST type messages from the Host, ConfigMgr sends a RoutingInfoMsg RESPONSE back to the Host indicating the request was acknowledged and attempts to retrieve the Routing Info. Once the Routing info is retrieved, ConfigMgr sends a RoutingInfoMsg S_REPORT back to the Host with the routing information. ConfigMgr sends RoutingInfoMsg U_REPORT type messages to the Host upon request by another subsystem to send routing information. Upon receiving a request to send routing information from another subsystem, ConfigMgr checks the routing pending queue to determine if the Host requested the information. If so, ConfigMgr sends a RoutingInfoMgr S_REPORT to the Host with the routing information. Otherwise, ConfigMgr sends a RoutingInfoMsg U_REPORT to the Host with the routing information. After ConfigMgr sends a U_REPORT to the Host, ConfigMgr waits for the Host to acknowledge receiving the data by sending a RoutingInfoMsg ACK RESPONSE. If no response is received by ConfigMgr within the time limit, ConfigMgr requests the appropriate subsystem to send the application routing information again (to cause a resend of the data to the Host). If a NAK RESPONSE is received from the Host, ConfigMgr issues an IPR indicating a failed response code from the Host.

The Scheduled Action Control Message is processed by the platform manager node that is In-Service Active. If neither platform manager node is In-Service, the platform manager node that is OS-MIN Active will process the request. When SchedActCtlMsg SET type messages are received from the Host, ConfigMgr calls SetSchedAction operation of NetPM to enable/disable the scheduled actions (such as constant monitoring and generic audits) as desired. ConfigMgr sends a SchedActCtlMsg RESPONSE type back to the Host to indicate whether the Set was successful or not. ConfigMgr has a GetSchedActions operation that can be used by a client to get the Host time information. When this operation is invoked, ConfigMgr sends a SchedActCtlMsg REQUEST type message to the Host. ConfigMgr then sets up a Host Response Pending Queue entry for the desired SchedActCtlMsg S_REPORT from the Host. Processing (of GetSchedActions) is then suspended until the S_REPORT is received or the timer expires. No action is taken if the timer expires before receiving the scheduled actions. When ConfigMgr receives the SchedActCtlMsg S_REPORT type message from the Host, ConfigMgr will check if there is an entry for the SchedActCtlMsg S_REPORT in the Host Response Pending Queue. If so, ConfigMgr calls SetSchedAction operation of NetPM to enable/disable the scheduled actions as desired.

The Server Info Message is precessed by the platform manager node that is In-Service Active. If neither platform manager node is In-Service, the platform manager node that is OS-MIN Active will process the request. ConfigMgr sends ServeInfoMsg REQUEST and REQUEST ALL tupe messages to the Host during initialization processing and restore processing of aplatform managerserver. After the message is sent, ConfigMgr suspends processing of the task and sets up a Host Response Pending Queue entry for a ServerInfoMsg S_REPORT type (and/or COMPLETE type if REQUEST ALL is used). Initialization and restore processing is not continued until the required Server Info is obtained or the timer expires. If the timer expires (before info is obtained) during initialization, ConfigMgr sends the ServerInfoMsg REQUEST or REQUEST ALL again until the information is obtained. If the timer expires (before info is obtained) during restoral of aplatform managerserver, ConfigMgr issues an IPR that the restoral failed.

When ServerInfoMsg S_REPORT and COMPLETE messages are received from the Host, ConfigMgr checks if there is an entry for the ServerInfoMsg S_REPORT or COMPLETE in the Host Response Pending Queue. If so, the appropriate procedure will be called to complete initialization or restore processing. When ServerInfoMsg CHANGE type messages are received from the Host, ConfigMgr determines if it is in an appropriate state to process a server info CHANGE. If so, ConfigMgr informs NetPM of changed server information and sends a ServerInfoMsg RESPONSE type back to the Host to indicate whether the server information was changed successfully or not.

The Server Status Message is processed by the platform manager node that is In-Service Active. If neither platform manager node is In-Service, the platform manager node that is OS-MIN Active will process the request. Upon receiving a ServerStatusMsg REQUEST type messages from the Host, ConfigMgr obtains the server and query status information and sends a ServerStatusMsg S_REPORT back to the Host with the current status information. ConfigMgr sends ServerStatusMsg U_REPORT type messages to the Host when server status changes occur or as required during processing of a Host configure server request.

The Test Server Message is processed by the platform manager node that is In-Service Active. If neither platform manager node is In-Service, the platform manager node that is OS-MIN Active will process the request. If the target server is myself and my mateplatform manageris not halted, this platform manager node will discard the request while the otherplatform managerprocesses message. Upon receiving a TestServerMsg REQUEST or ABORT type message from the Host on the MAINT logical link, ConfigMgr determines if the target server's status is MOS_MIN. If so, ConfigMgr sends a TestServerMsg Acknowledge RESPONSE back to the Host. In the future, ConfigMgr will initiate or abort the appropriate test based on whether a REQUEST or ABORT is received. If the target server is not MOS_MIN, ConfigMgr sends a TestServerMsg Server Not MOS-MIN RESPONSE back to the Host. If the target server status cannot be obtained, ConfigMgr sends a TestServerMsg Denied RESPONSE back to the Host and issues an appropriate IPR.

The Time Message is processed by the platform manager node that is In-Service Active. If neither platform manager node is In-Service, the platform manager node that is OS-MIN Active will process the request. Upon receiving a TimeMsg SET type messages from the Host, ConfigMgr calls SetTime operation of NetPM to set the server network time to the appropriate time and sends a TimeMsg RESPONSE back to the host to indicate whether the Set was successful or not. ConfigMgr has a GetTime operation that can be used by a client to get the Host time information. When this operation is invoked, ConfigMgr sends a TimeMsg REQUEST type message to the Host. ConfigMgr then sets up a Host Response Pending Queue entry for the desired TimeMsg S_REPORT from the Host. Processing is then suspended until the S_REPORT is received or the timer expires. No action is taken if the timer expires before receiving the timer information. Upon receiving a TimeMsg S_REPORT type message from the Host, ConfigMgr will check if there is an entry for the TimeMsg RESPONSE in the Host Response Pending Queue. If so, SetTime operation of NetPM is called to set the server network time.

Node Management Services

Node Platform Manager (NodelPMMMain)

The Node Management subsystem provides process management within a single server node. It is responsible for starting/stopping processes within the server node to maintain specific run-levels. Run-levels supported by Node Management are HALTED (No software running–not even OS)

MIN-SET (OS+Minimal Required Platform Software)

INSERVIConfigurable element (MIN-SET+Common Software)

Network Management informs Node Management of the desired run-level for a specific node. In the event of a process failure, Node Management evaluates the failure and determines what, if any, recovery action is necessary. Recovery actions include ignoring the failure, autostarting the node to the next lower run-level and back to the current run-level, and system shutdown.

NodePM will ve brought up as part of System start-up procedure for each server node. As part of its initialization, NodePM:

Instantiates the NodeMAP object, and after getting the configuration information on the minimum Configurable elements that need to be configured on each servers, it brings up the server node to a minimal operational state (OS-MIN). From this state the server node is allowed only a minimum set of functionality such as bringing the rest of the processes up. The configuration data provided in each node's NodeMAP determines the capabilities of each server node (server nodes withplatform managercapabilities versus server nodes with query processing capabilities).

Creates the NodePM server object to handle the NetPM requests to perform operations within the same server node.

Per NetPM request, NodePM (through operations provided by its server object) can perform the following operations:

Bring up its server node to a fully operation state (IN-SERVIConfigurable element) from a minimal operational state (OS-MIN) (RestoreNode operation).

Bring down its server node to a minimal (OS-MIN) or halted (HALT) operational state from a fully operational state (IN-SERVIConfigurable element) (RemoveNode operation).

Enable/Disable the query processing on its server node.

Provide status information on Configurable elements.

NodePM reports any change of status on each IPU autonomously to NetPM (NodePM utilizes the operation provided by NetPM to report the status change).

Figure 8:
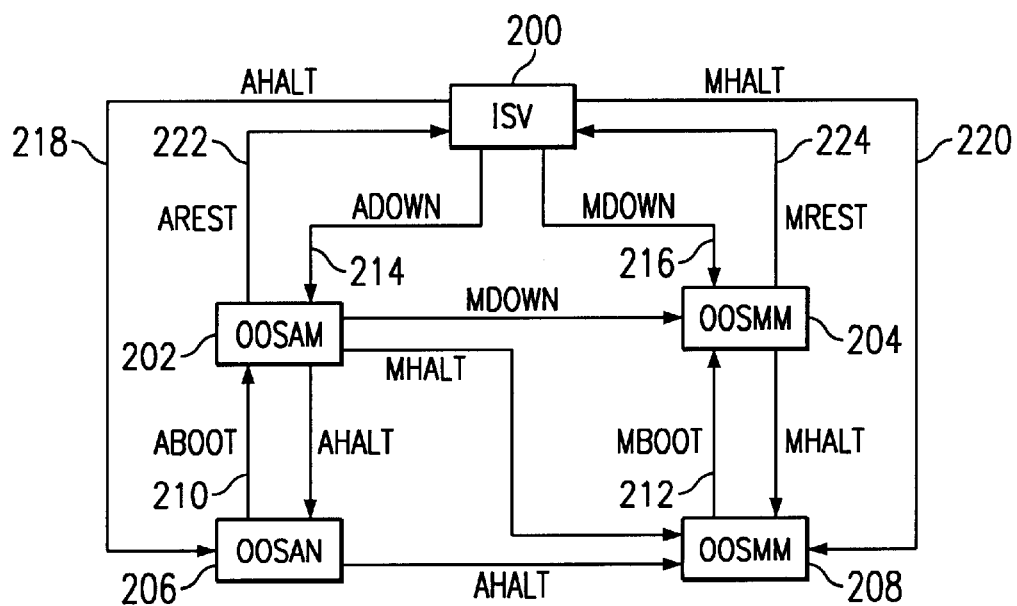
FIG. 8 is a state transition diagram of telecom platform nodes according to an embodiment of the present invention.

FIG. 8 is a diagram showing the legal service state transitions for a node. Notice that all automatic states transition to other automatic states and all manual states transition to other manual states. There is no legal transition from a manual state to an automatic state. The ISV state has no automatic or manual designation at this time. States can transition form/to IN-SERVICE (ISV) state 200 to/form any other state. The acronyms used in FIG. 8 are decoded as follows:

| | |
|---|---|
| ISV 200 | in service |
| OOSAM 202 | automatic out of service minimal |
| OOSMM 204 | manual out of service minimal |
| OOSAN 206 | automatic out of service-halted |
| OOSMN 208 | manual out of service-halted |
| ABOOT 210 | automatic boot |
| MBOOT 212 | manual boot |
| ADOWN 214 | automatic downgrade |
| MDOWN 216 | manual downgrade |
| AHALT 218 | automatic halt |
| MHALT 220 | manual halt |
| AREST 222 | automatic restore |
| MREST 224 | manual restore |

Node System Integrity (NodeSIMain)

The Node System Integrity subsystem (class name NodeSI) provides fault isolation and monitoring services within a single server node. All process failures are logged by this subsystem and forwarded to node Management for recovery action. Node System Integrity implements the following features:

Passive process monitoring (signal catching)

Inter-nodal communications monitoring

Local fault reporting

The System Integrity (SI) capabilities of the AIN platform can be categorized as those providing capabilities across the server nodes of the platform, and those that provide capabilities within a single server node. While NetSI handles the system integrity capabilities at the platform level, the NodeSI provides system integrity at the single node level. NodeSI resides in every server node of the platform, and provides operations through which processes for each configurable element can report fault conditions on that process. These faults include:

Faults detected by Constant Monitor object on each process.

Inter nodal communication failures.

Communication failures between the host and server network.

Faults detected by IM Server process.

It also performs node constant monitoring of all connections to/from the node. It a communication fault is detected, NodeSI will inform NetSI of the communication fault. Depending on the reported fault, NodeSI will take appropriate actions, including issuing IPRs, and downgrading the node's state (in cooperation with the NodePM).

NodeSI monitors the disk utilization on each server node, the issues appropriate IPR when the total capacity used on a particular file system exceeds a certain threshold. NodeSI communication with other objects is handled via the DOME interface. NodeSI gets the list of all IPUs in the configuration from NodePM. An array is set up containing the following information from each IPU:

IPU information received from NodePM

IPU status

Fault count

Alive message received indicator

An array index into this list is used to communicate status with the other NodeSI's rather than the node name since string comparisons con be costly in terms of speed and efficiency. Therefore, it is important that each node in the configuration have the same IPU list in the same order.

NodeSI registers with NodePM to get node state notifications. When NodeSI is informed of a status change for another IPU, it will update the IPU status in the IPU array. It the status change is to the halted state, NodeSI will clear the fault counts and alive message received indicator.

NodeSI has two timers to handle its constant monitoring function:

BroadcastTimer—timer that causes NodeSI to broadcast "I'm alive" messages to the other NodeSI's in its view.

ConMonChkTimer—timer that causes NodeSI to determine if the appropriate "I'm alive" messages have been received for all connections within the time interval.

When NodeSI is informed that is node is OS-MIN, it starts broadcasting "I'm alive" messages to the other NodeSI's in its view. It then triggers the BroadcastTimer. Upon BroadcastTimer expiration, NodeSI immediately rebroadcasts the "I'm alive" messages and retrigger the BroadcastTimer. This will interrupt any NodeSI processing that may be going on.

When NodeSI receives an "I'm alive" message from another NodeSI, it marks the appropriate IPU array entry's Alive message received indicator.

When NodeSI is informed that is node is OS-MIN, it triggers the ConMonChkTimer. Upon ConMonChkTimer expiration, NodeSI makes a Dome call to the CommFailCheck operation to perform communication failure checking and retrigger the timer. It is using the DOME call to itself in order to assure that priority is given to broadcasting the alive messages.

Communication failure processing involves checking each IPU in its array to determine if an alive message have been received since the last time it checked. If so, the Alive message received indicator is cleared. If no message has been received and the IPU status is not halted, the fault count for that node will be incremented. If the number of faults for that IPU is at its maximum, NodeSI reports a communication failure to NetSI.

The maximum number of fault counts is a configurable value that can be read in from the command line by using the keyword "MAX_COMM_FAULTS". If no value is given, the default number of fault counts will be 2. Also, if the value given in the command line is less than 2, the maximum number will be set to 2.

The number of seconds between each broadcast of alive messages is a configurable value that can be read in from the command line using the keyword "BRDCAST_ALIVE-SECS". If no value is given, the default number of seconds between broadcasts will be 1 second. If the value given in the command line is less than 1 second, the number of seconds will be set to 1.

The number of seconds between each constant monitoring check is a configurable value that cen be read in from the command line using the keyword "CONMON_CHK_SECS". If no value is given, the default number of seconds between checks will be 2 seconds. If the value given in the command line is less than 2 seconds, the number of seconds will be set to 2.

NodeSI is started by NodePM as part of every node's start-up, and prior to other processes start-up. As part of its initialization, NodeSI reads a descriptor file (Fault.des) containing the definition of the faults detected by the NodeSI, and creates a list (FaultInfoList) of those fault records. Each fault record (FaultInfo) contains the following parts:

FaultId—Fault Identification.

FaultActId—Action to be taken per Fault reported.

As faults are received, NodeSI will search for the fault record in its list (FaultInfoList) using the fault's Id, and performs the action associated with that fault. These actions may include:

Issuing appropriate IPRs.

Halting the node in case of detecting catastrophic faults on NodePM process.

Reporting autonomous status changes on Configurable elements to NodePM.

Reporting communication failures to NodePM and in turn to NetSI.

All faults (originated from Constant Monitor or other processes) will be reported to the NodeSI by each process via NotifyFault( ) operation of NodeSI. NodeSI keeps track of disk utilization on the server node, and issues an IPR if 80 was used.

NodePM Interface

NodeSI uses the interface provided by NodePM to report the autonomous changes in a Configurable element's status (AutoChgCEStat( . . . )). Depending on the configurable element's impact on the state of the node, the status change may cause NodePM to perform any of the following actions:

Downgrade Node's State—This action is performed if the configurable element's status change had a major impact on the current operational state of the node. Prior to doing this, NodePM will inform the NetSI of its intent, and starts a timer. Then upon request from NetPM or time-out, it will downgrade the node's state.

Report Communication Failure—This action is performed if the configurable element's status change indicated an internodal communication failure (TCP link goes out of service). For this situation, NodePM will notify NetSI of communication failure, and attempts to establish the communications again.

NetSI Interface

NetSI provides operations, used by NodeSI and/or NodePM to report the following conditions:

Autonomous changes in an IPU's status (DowngradeIPStat( . . . ))—In this situation, NetSI downgrades the node through NetPM (requests NetPM to downgrade, if the node was not halted already).

Communication failures (CommFaultRprt( . . . ))—In this situation, if communications failure to the same IPU was reported by other IPUs, then NetSI will mark that IPU as the IPU in fault, and attempts to downgrade it through NetPM.

Constant Monitor Interface

Each Configurable element process is required to instantiate the Constant Monitor object, in order to detect and report abnormal conditions/events generating different signals on the process. Constant Monitor reports these conditions via NotifyFault( ) operation of NodeSI. In case of failure to communicate the fault to NodeSI, the Constant Monitor may HALT the node, depending on the options set at the time of its instantiation.

Message Handler/Logical Links Interface

Message Handler or Logical Link configurable element processes utilize the NodeSI operation NotifyFault( ), to report faults on DNI/TCP links.

Service Manager (SMProcess)

The service management subsystem provides process control for application processes. Application processes are only run after the node has achieved the IN SERVICE run-level. Application processes can be individually removed/restored and enabled/disabled on a server node. Network management informs service management as to which applications to remove, restore, enable, disable. Features implemented by service management include:

Active Process Monitoring (Heartbeats, Audits)

Multiple process instance support

Figure 9A:
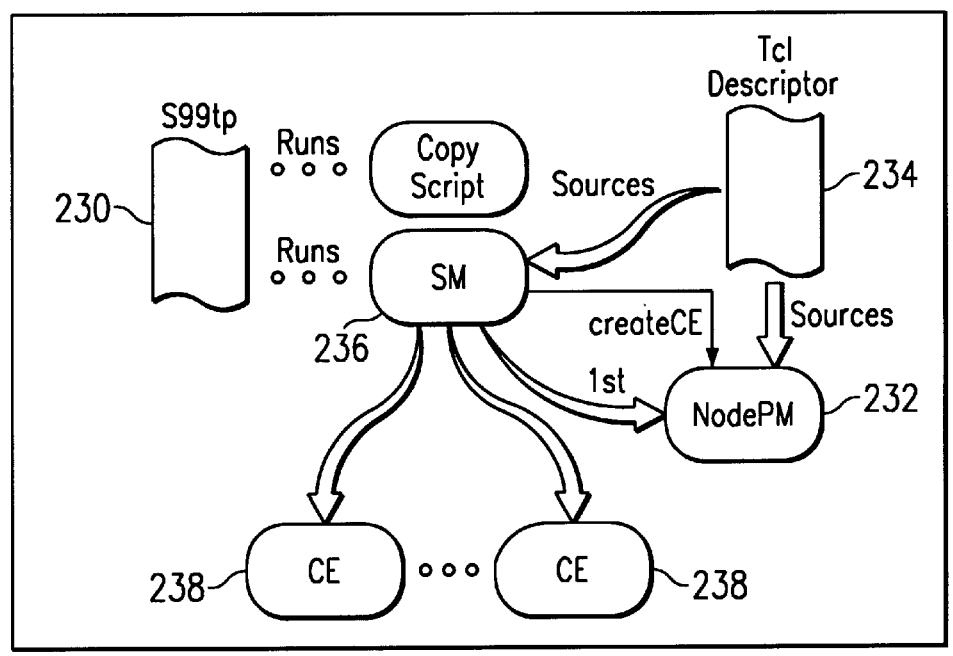
FIG. 9A is a simplified block diagram of node start up process according to an embodiment of the present invention.

Application Process State Management
   Administrative State
   Operational State
   Usage State Application process state change notification For the telecom platform Navigator feature to present a consistent configurable element interface, a change has been made to have service management start System configurable elements instead of NodePM. By doing this, all processes in the system (except service management) are started by service management, so the features of a configurable element are now the same system-wide. To create a telecom platform Navigator GUI, a consistent view of a telecom platform system has to exist. FIG. 9A is a diagram that shows the new relationship that exists during node initialization between entities in the telecom platform. For a configurable element to be able to take advantage of all service management functionality, the service management interface needs to be followed.

A boot script 230 is created to be the first thing to run on all nodes. When the boot program 230 runs, it will identify the platform manager node 232, and copy the active platform manager node's Tcl descriptor file 234 over to use to bring up that node. If is determines that it is the first platform manager node to come up, it will use the existing Tcl descriptor file 234 to run.

The platform manager subsystem, and the service management subsystem 236 have a different concept of what a configurable element 238 is in the previous version of the platform. These two concepts are joined into one configurable element concept, merging their separate functionalities. To do this, the platform manager subsystem will no longer remove and restore configurable elements, but will inform service management when it wants a configurable element to be removed and restored. Service management will now be the first telecom platform program started, and will always start NodePM as part of its initialization. NodePM will then be in control of starting and stopping processes that same as it was before, only through the service management, not through the old RemoveCE and RestoreCE functionality.

Figure 9B:
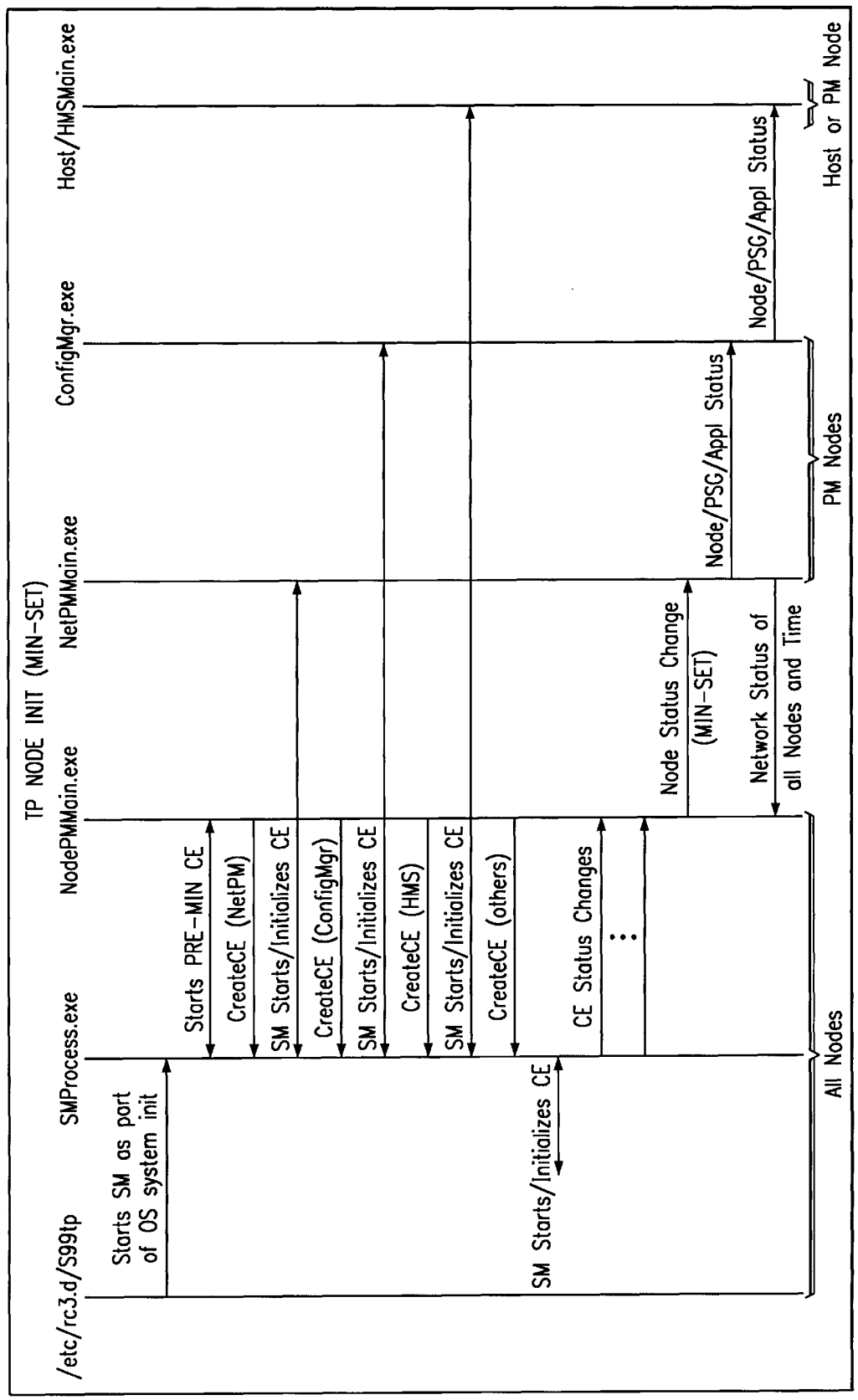
FIG. 9B is a message flow diagram of node initialization process according to an embodiment of the present invention.
Figure 9C:
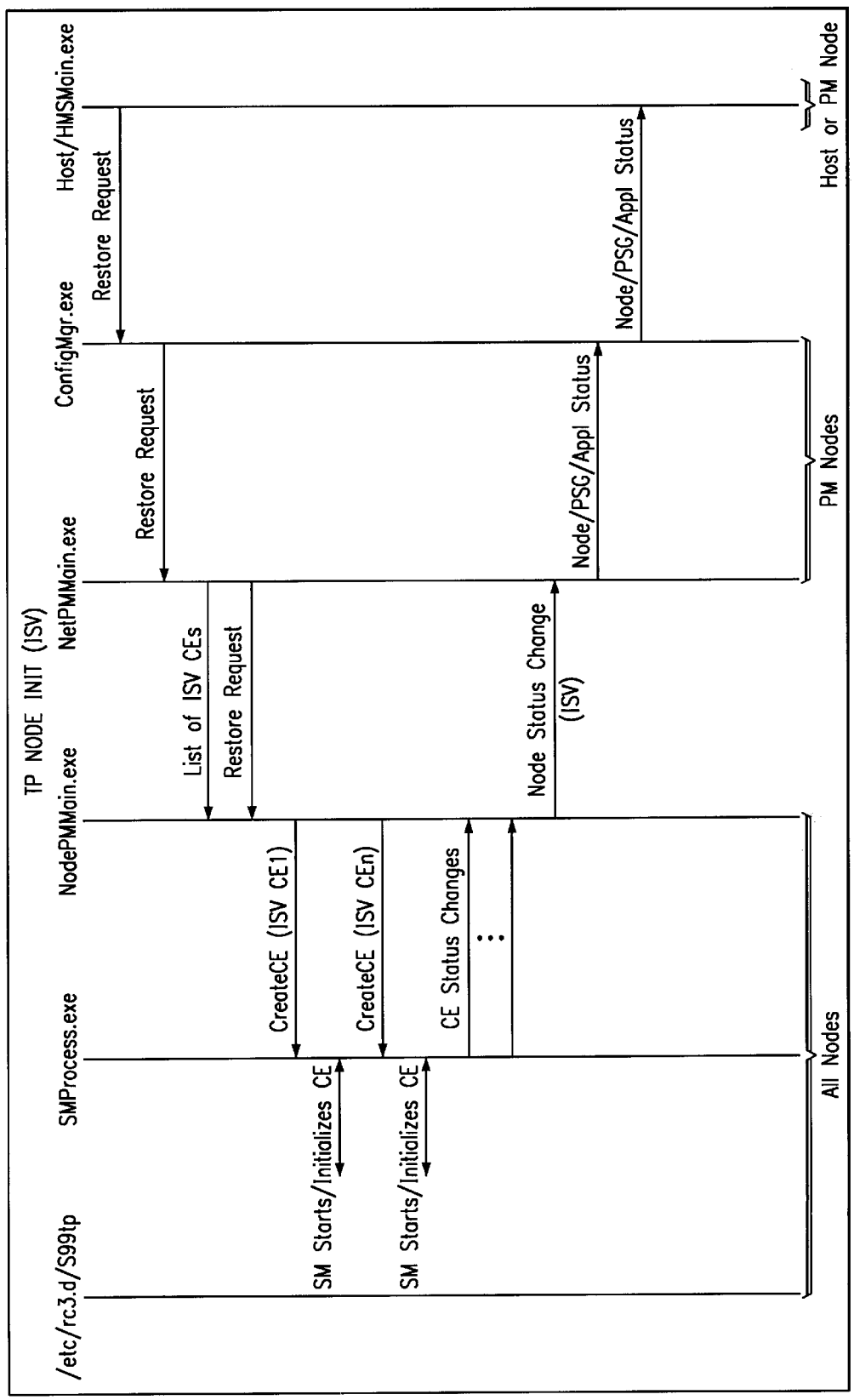
FIG. 9C is a message flow diagram of node initialization process according to an embodiment of the present invention.
Figure 9D:
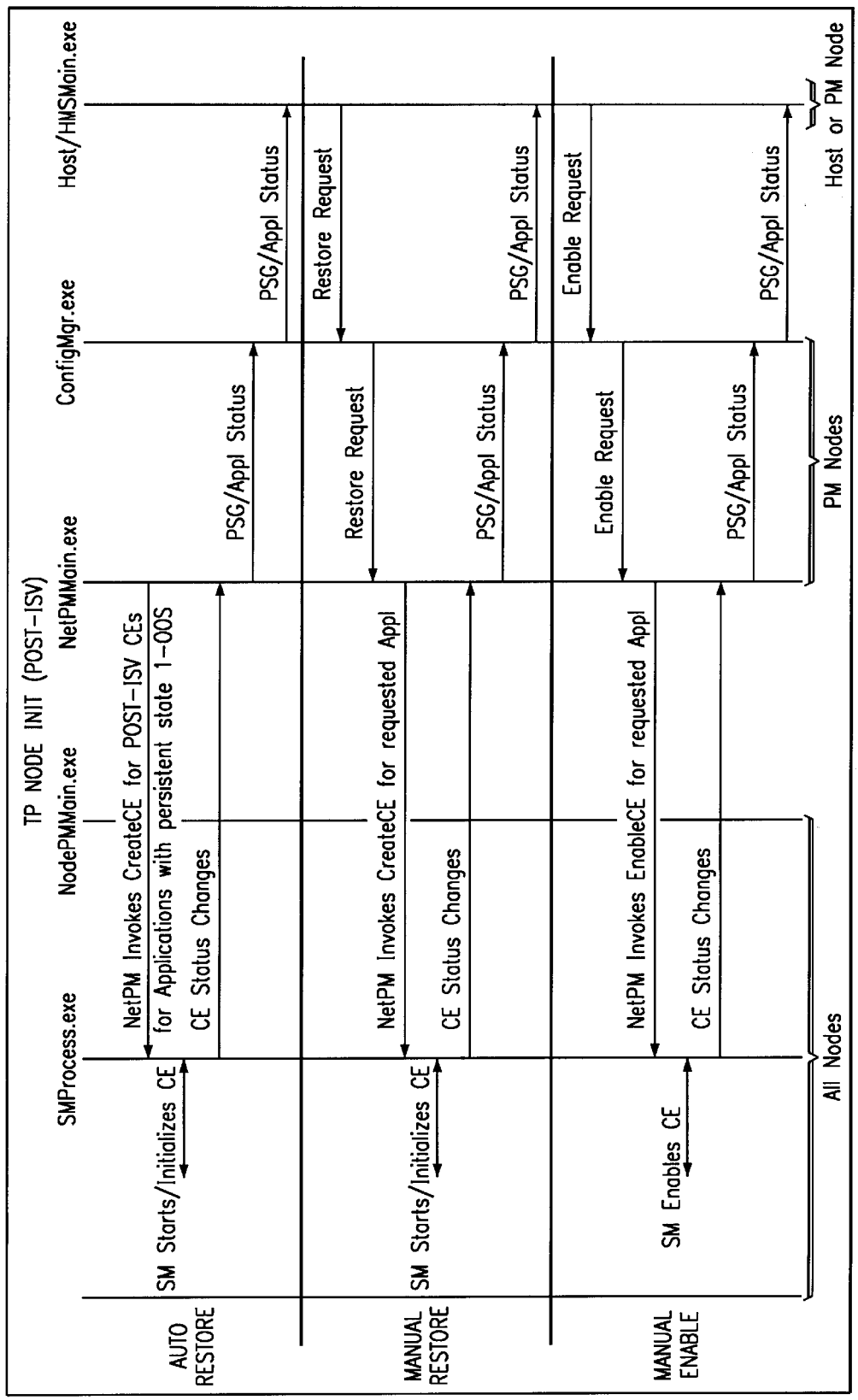
FIG. 9D is a message flow diagram of node initialization process according to an embodiment of the present invention.

FIG. 9B is a message flow diagram showing node initialization into the MIN_SET state. FIG. 9C is a message flow diagram showing node initialization into the IN_SEVICE state, and FIG. 9D is a message flow diagram showing node initialization into the POST_ISV state.

Figure 10:
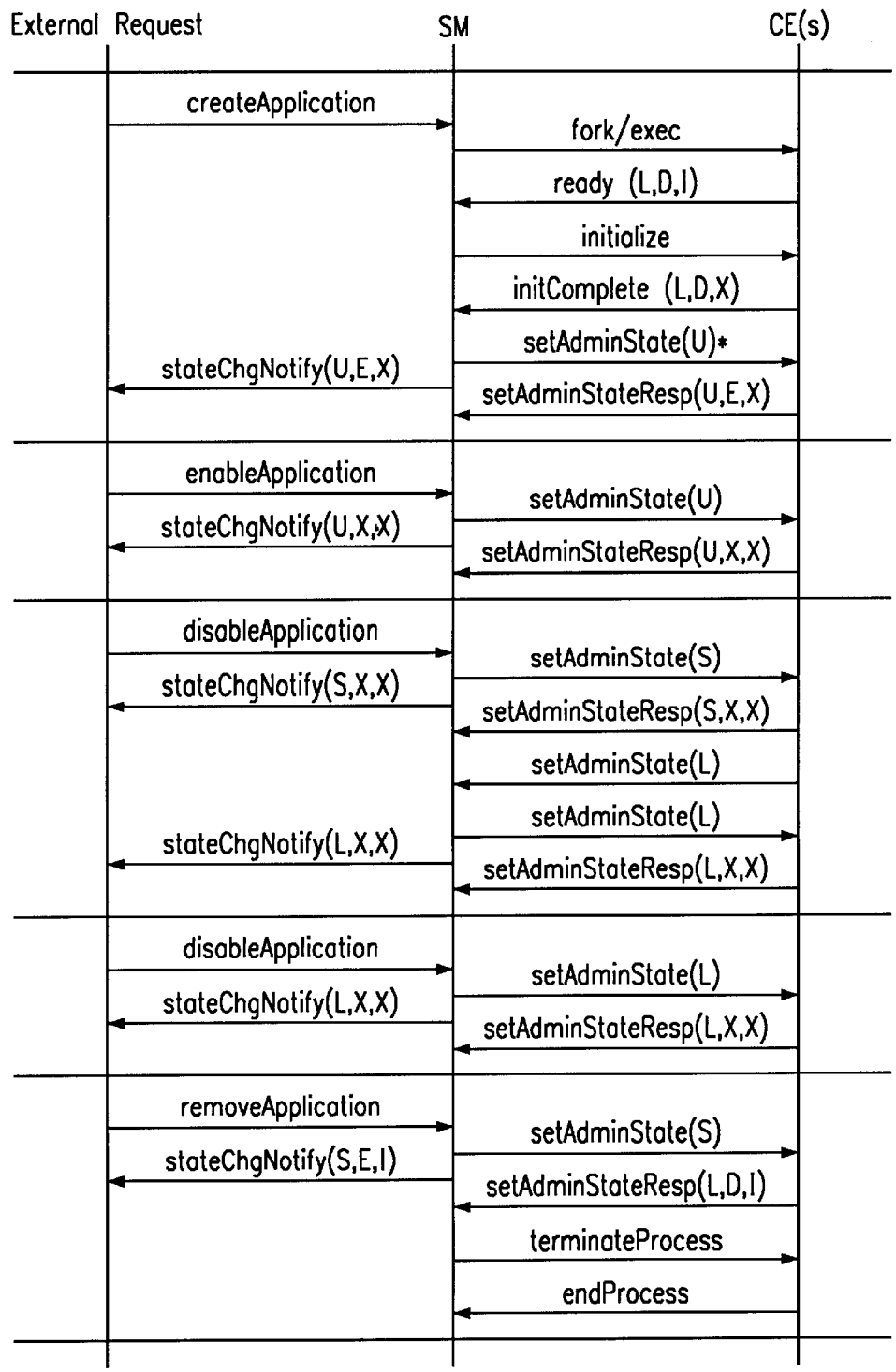
FIG. 10 is a message flow diagram of service management interface protocol according to an embodiment of the present invention.

FIG. 10 outlines the messages protocol that is used between SM and a Configurable element. If a configurable element cannot for link a service management interface (SMI) object into it, service management can still start that configurable element, but many of the features that service management provides will not be available.

Event Manager (eventmanagerimpl)

The event manager subsystem provides the ability for a users to generically issue event notification to one or more registered parties. Multiple Event::Manager object instances may exist in the system. A node level Event::Manager exists on all nodes. Other Event::Manager instances may also exist to provide the ability for interested parties to register for events that are special to a process. The eventmanagerimpl program provides an Event::Manager object instance for the mode that it is running on. Events that are relevant to a node get issued through that Event::Manager instance. Users interested in events on a particular node can bind to that nodes Event::Manager instance by using that nodes name as the Event::Manager name. Programs can also embed an Event::Manager object within their program. The IprMgrImpl program is an example of a program that does this. The IprMgrImpl has an Event::Manager named IprEventMgr. Users that wish to receive IPR events. Users that are interested in a particular event may register with a particular Event::Manager instance to receive that event through that Event::Manager instance. The Event::Manager does not persistently store the list of registered parties. If the Event::Manager tries to forward an event to a Event::Receiver that has gone away, that Event::Receiver is removed form the list.

Figure 11:
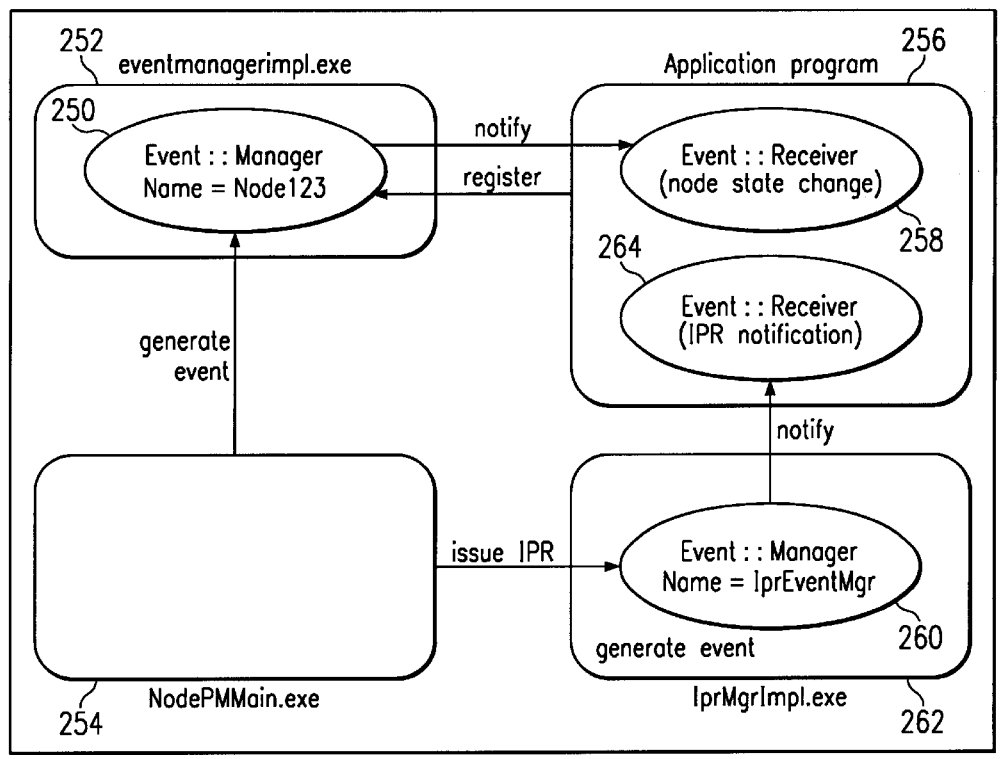
FIG. 11 is a simplified block diagram showing Event Manager uses according to an embodiment of the present invention.

FIG. 11 shows two examples of uses for Event::Manager 250 in the telecom platform system. The eventmanagerimpl 252 contains the node Event::Manager object instance 250. The NodePMMain telecom platform program 254 uses this Event::Manager 250 to issue an event when the node changes state. The application program 256 then creates an Event::Receiver object 268 and passed a CORBA object reference to the register call on the "Node123" Event::Manager 250, When NodePMMain 254 generates an event by calling notify on the "Node123" Event::Manager 250, that Event:Manager 250 will find all of the Event::Receiver objects 258 that have registered to receive this event. Seeing that the application program has registered for this event, the Event::Manager 250 will call the notify( ) method on that Event::Receiver object 258 which will cause the notify ( ) method to be invoked in the Application program 256. In the example above, the Application program 256 has also registered with the "IprEventMgr" Event::Manager 260 in the IprMgrImpl program 262. When NodePMMMain 254 uses the IprMgrImpl interface to issue an IPR, the IprMgrImpl program 262 does the lookup on that IPR and performs verification, and calls notify ( ) on the "IprEventMgr" Event::Manager 260. This cause that Event::Manager 250 to forward the generated event to the Event::Receiver 264 in the application program 256 that was passed in the register call.

Application programs 256 can create their own Event::Manager with its own name the same way the IprMgrImpl program did. Event::Manager instances need to have unique names in the system to prevent generating an event to the incorrect Event::Manager, or to help isolate a user from registering with the incorrect Event::Manager.

IPR/ALARM Services

The Information and Problem Reporting (IPR) subsystem provides all processes in the system with the ability to issue Information and Problem Reports. IPRs are the standard mechanism used to inform users of the system about error conditions or other pertinent system information. The Information and Problem Reporting subsystem implements the collection of IPRs in the telecom platform. An alarm is a mechanism which may be attached to an IPR. Alarm services are not available now, but will be available in future release of telecom platform.

The IPR subsystem provides several features. It provides active/standby IPR service redundancy, the ability to forward IPRs to registered receivers, the ability to forward IPRs to the host, the ability to display IPRs in real-time, backward compatibility with the legacy PAConfigurable element IPR interface, a CORBA IPR interface, the ability to use an IPR dictionary to validate IPRs, the ability to provide additional information about the IPR that was issued from the IPR dictionary, and the ability to provision IPR in the IPR dictionary.

Figure 12:
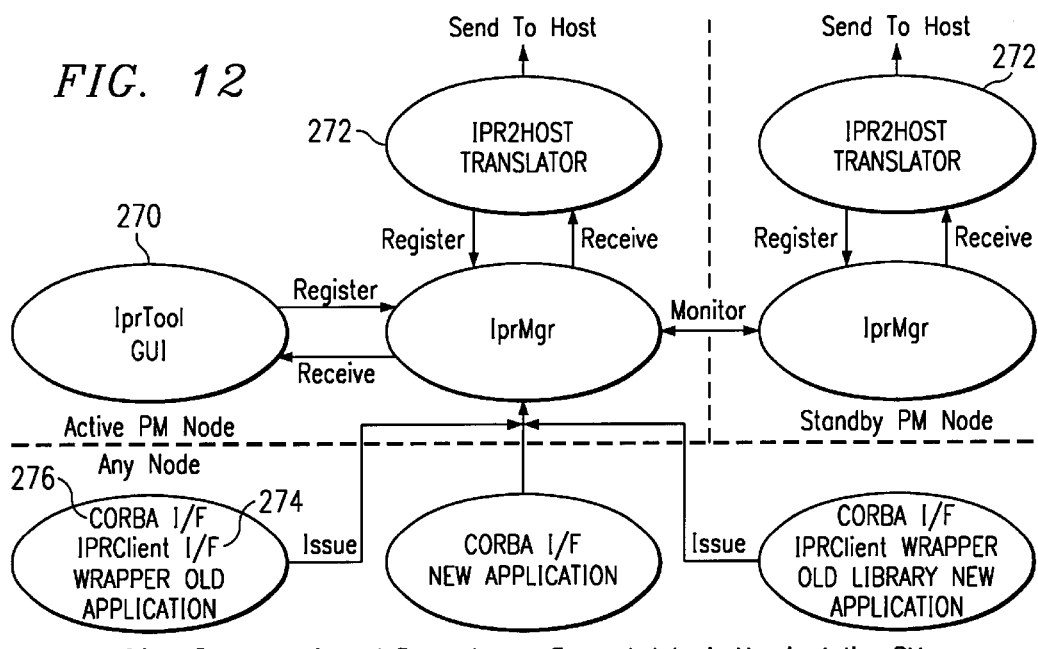
FIG. 12 is a simplified information and problem report (IPR) flow diagram according to an embodiment of the present invention.

Referring to FIG. 12, the IprMgrImpl program is the collection point for all IPRs in a telecom platform site. This program contains the IprMgrImpl CORBA server object. The IprMgrImpl object runs on each of the active/standby platform manager nodes. The active/standby state that the IprMgrImpl reacts to is the node level active/standby state of the telecom platform manager nodes. The standby IprMgrImpl object will unpublish its interface, and the active IprMgrImpl object will publish its CORBA interface when the platform manager nodes change active/standby state. By doing this, client users of both the IprMgr and IPRClient interfaces will have their IPRs forwarded to the active IprMgrImpl object.

The Event Manager subsystem is used within the IPR subsystem to distribute IPRs. This allows IPRs to be forwarded to multiple destinations. By using the Event Manager, additional IPR features can be easily added to the system without incurring interface changes. The Event Manager mechanism of the IPR subsystem is currently used within the telecom platform to provide some existing IPR services. The real-time IPR GUI 270 registers to receive IPRs for the purpose of displaying IPRs as they occur. The Ipr2host program 272 registers with the IPR subsystem to receive IPRs and forwards them to the host. An IPR logger may also register to receive IPRs to log to disk.

The ipr2host program 272 is responsible for forwarding IPRs to the host. It receives IPRs from the IprMgrImpl's Event Manager, and formats a host message to forward on. All IPRs that get forwarded to the host use the message handler subsystem to forward IPRs over the IPR_ASSERT logical link.

The IPR subsystem has a two external interfaces: the IPRClient interface 274 and the CORBA IPR interface 276. The IPRClient interface 276 exists for backward compatibility with previous PAConfigurable element releases. Once the issued IPR from the IPRClient interface 274 has been converted by the IPRClient code, an IPR is issued using the IprMgrImpl CORBA interface to route the IPR to the active IprMgrImpl object. This interface still uses the LOCIPRDB.DSK IPR dictionary as input for converting the old PAConfigurable element IPRs to the current IPR subsystem format. This requires that a LOCIPRDB.DSK reside on each node that has programs that issue IPRs. The LOCIPRDB.DSK dictionary was used in the previous releases to do IPR verification before IPRs were forwarded to the host. The RegisterIPR utility is used to enter IPRs into the LOCIPRDB.DSK dictionary. The fields in the database entries include: ASCII key (IPR text), host IPR number, IPR priority, number of data words used, and data word format. In order to test the IPRMgr, IPRs must be defined in ipr.in which will be converted to a keyed dictionary (via the RegisterIPR utility).

The IprMgrImpl interface is a CORBA IDL interface. If an IPR is issued using this interface, it is not required to be entered in the LOCIPRDB.DSK dictionary. When the IprMgrImpl object receives an issued IPR, it looks it up in its IPR dictionary and constructs an IPR event to be issued. The IPR event contains information that was passed from the client that issued the IPR, and information from the IPR dictionary. IPRs must be added to the IPR dictionary and the MegaHub host IPR dictionaries prior to issuance of an IPRs. The IprDriver tool is used to add IPRs to the IprMgrImpl IPR dictionary. The reformat and reformat2 scripts exists to assist in converting a VAX IPR file to a format that can be used with the IprDriver to populate the IprMgrImpl IPR dictionary.

FIG. 13 illustrates the scenario where an application issues an IPR, the IPR Manager processes it, and the Event Manager routes the IPR to an IPR GUI for visual display.

1) The IPR GUI registers an interest in receiving all IPRs reported to the IPR Event Manager.
2) An application issues an IPR.
3) The IPR Manager forwards the IPR to the Event Manager.
4) The Event Manager distributes the IPR to the IPR GUI.

FIG. 14 is an example of an IPR View GUI screen print. The IPR View GUI application provides the display of IPRs in a split window. In the top pane a graphical view of IPRs is shown with costs vs. time displayed on category basis. The bottom pane displays a traditional full/brief text view of IPRs. Subcategories may be viewed and a number of customizations of the display are allowed. In addition, filtering and highlighting are available for the IPRs displayed. Communication is handled via CORBA.

Statistics Services
Data Collection (DcMProcess, DcProcess)

Figure 15:
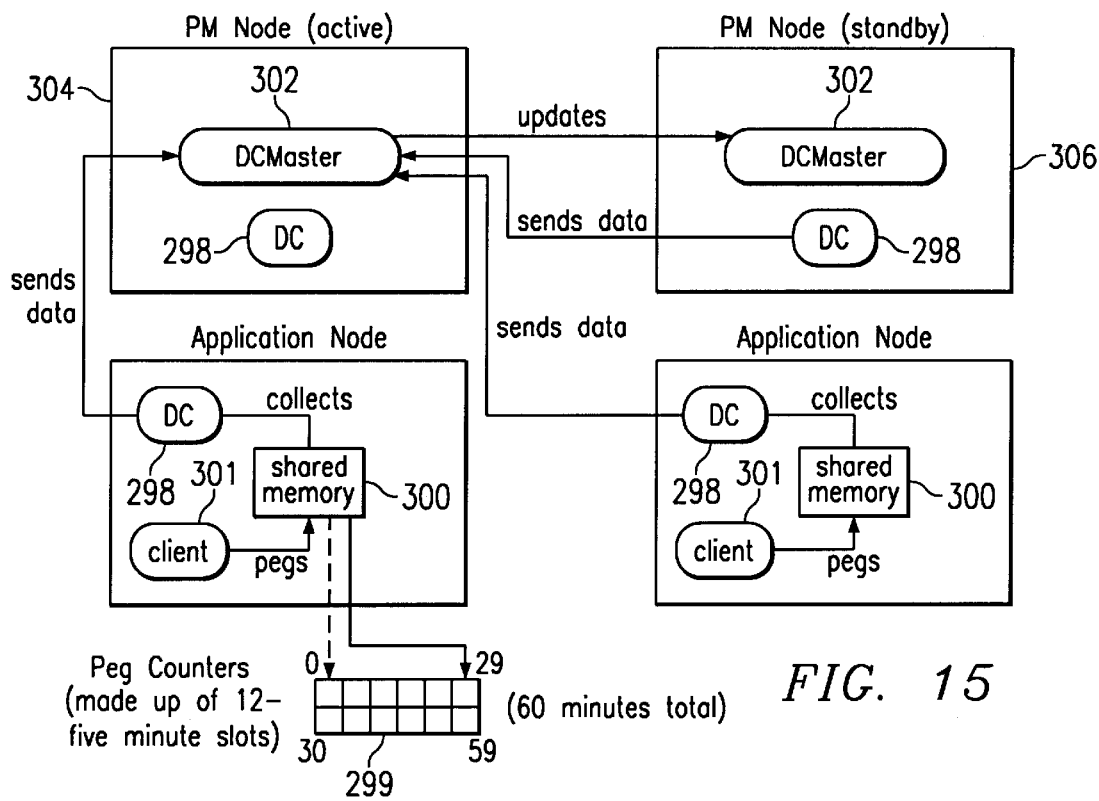
FIG. 15 is a simplified block diagram showing data collection according to an embodiment of the present invention.

Referring to FIG. 15, the data collection subsystem (DC) 298 provides the traffic measuring functionality for the application programs within a node. These measurements are counts recorded by the PegCounter class and elapsed time recorded by the TimeMeter class. PegCounter 299 testing will indirectly test shared memory 300 and semaphores. Client processes 301 peg to shared memory 300, and data collection 298 collects from shared memory 300 and sends to DCMaster 302. Every 30 minutes, data collection 298 sends the DCMaster 302 (in the active platform manager node) the 30 minutes worth of peg counter slots 299 and then data collection zeros out those slots. The active platform manager node 304 updates the standby platform manager node 306.

Figure 16:
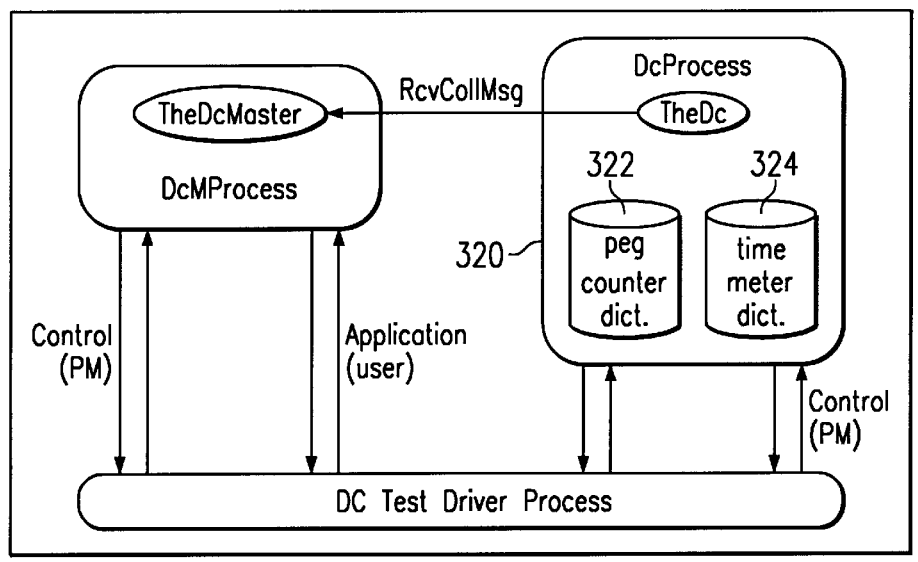
FIG. 16 is a simplified block diagram of the data collection subsystem according to an embodiment of the present invention.

Referring to FIG. 16, the statistic services or data collection subsystem 320 provides the traffic metering and measurement capabilities of the platform. This subsystem 320 supports the creation, collection, and reporting of statistical measures like peg counters, time meters, threshold counters, collection and querying. PegCounters 322 and TimeMeters 324 are shown supported across a distributed application. Features implemented by the data collection subsystem 320 include:

PegCounter 322 and TimeMeter 324 API Support
  Collection of accumulated data from multiple nodes
  Reporting GUI for local viewing of statistics
  User defined measurement sets for report customizing Threshold Counters (TCServer)

The threshold counter subsystem may be implemented as an object request broker (ORB) distributed object, using the orbeline ORB implementation. Applications are connected via Orbeline to a server object resident in the platform manager nodes. The server reports counter threshold crossings to applications via distributed object messaging environment (DOME). The server object are created by the thresholds counter server process, TCServer. Each TCServer process also communicates via Orbeline with the TCServers on remote nodes so that counters can be synchronized across sites. The TCServer keeps all counters in persistent storage using the persistent dictionary supplied in the common services library as template class RepShmDict.

Figure 17:
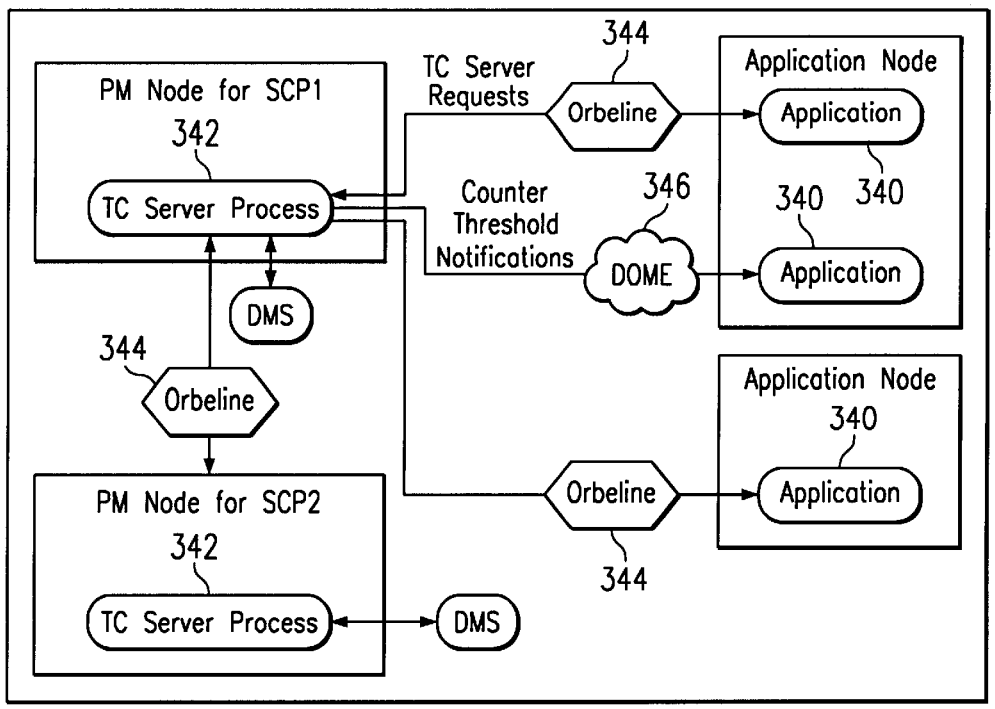
FIG. 17 is a simplified block diagram of the threshold counter data communication paths according to an embodiment of the present invention.

FIG. 17 shows the communication paths between application processes 340 and the counter server processes. The TCServer process 342 communicates with application processes 340 via both Orbeline 344 and DOME 346. The TCServer process 342 runs in an orbeline impl_is_ready loop, waiting for service requests from either application processes 340 or from a TCServer process 342 on another node. It makes a DOME ReqServ call to notify application processes 340 that a counter has reached its threshold.

Figure 18:
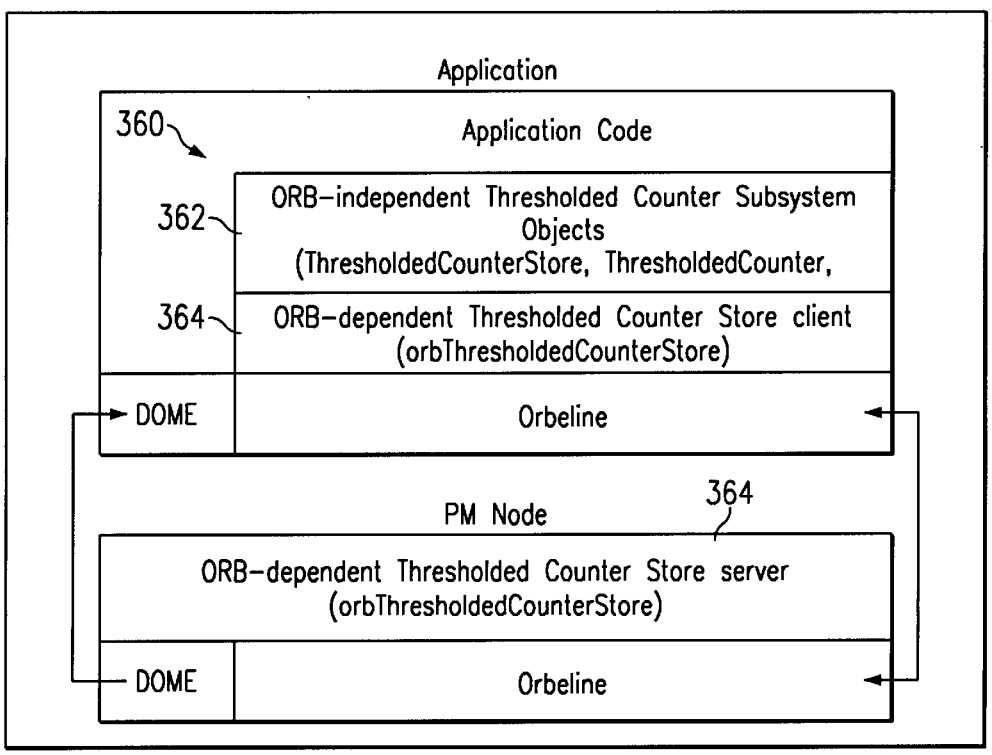
FIG. 18 is a simplified block diagram of the threshold counter subsystem according to an embodiment of the present invention.

Referring to FIG. 18, the threshold counter subsystem 360 API hides the orbeline-specific portions of the implementation from the application programmer. Instead, the client side of the subsystem will consist of two layers: an ORB-independent layer 362, and an orbeline-dependent layer 364. Although the orbeline-specific implementation of the subsystem is hidden from the application programmer, the distributed nature of the subsystem is not. To minimize the time required for counter increments, counter increments are buffered in the API, and sent to the server in batches. This means that the application is unable to receive immediate notification of the success or failure of some operations on the API objects.

Communications Services
Message Handling (MsgHndl, LinkXXX)

Figure 19:
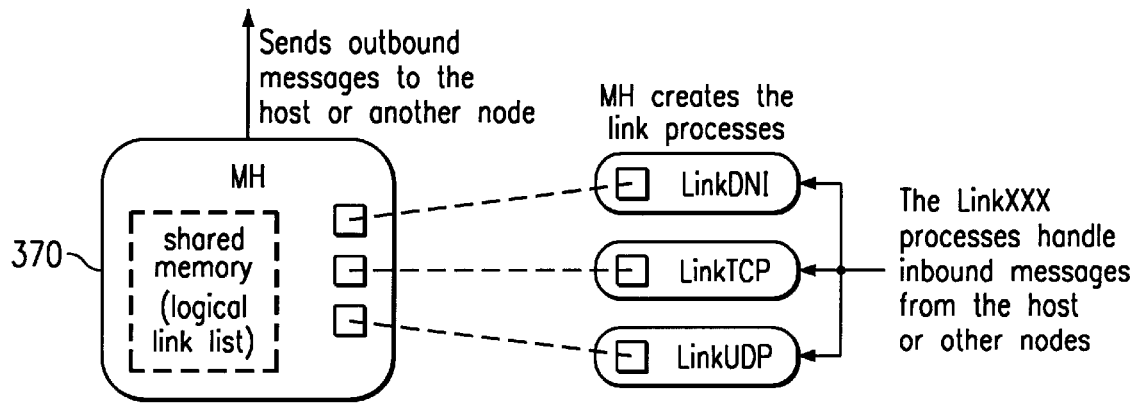
FIG. 19 is a simplified block diagram of the message handling subsystem according to an embodiment of the present invention.
Figure 20:
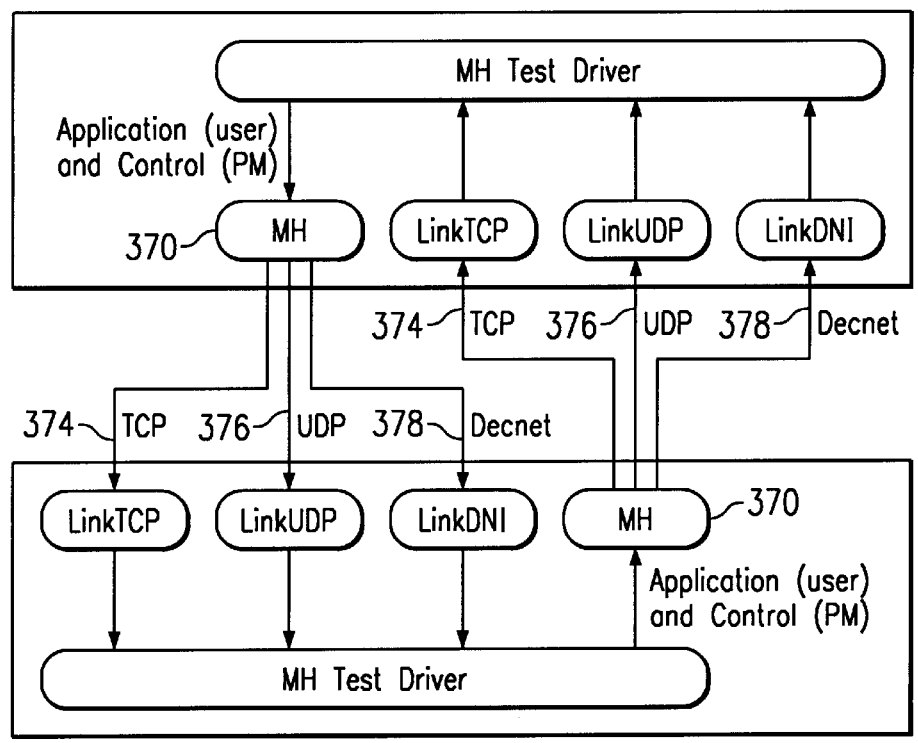
FIG. 20 is a simplified block diagram of message handling testing according to an embodiment of the present invention.
Figure 21:
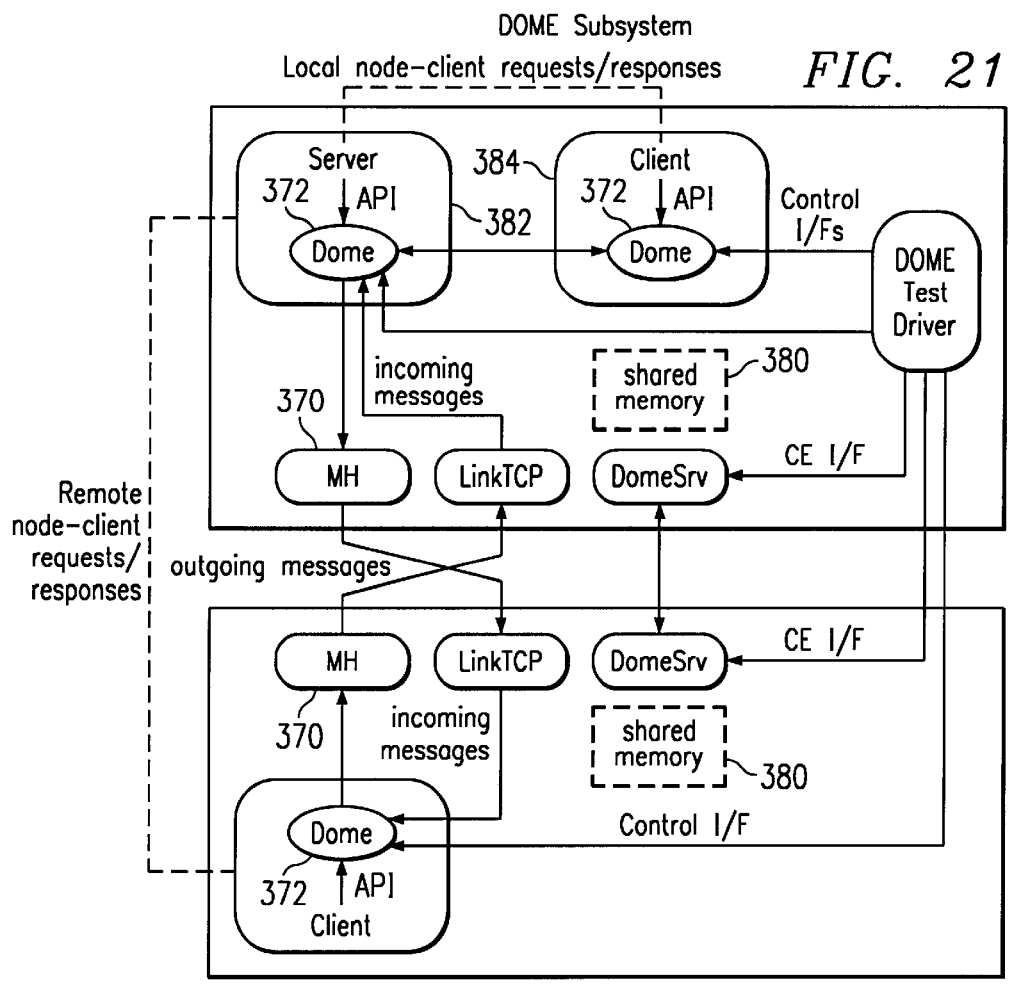
FIG. 21 is a simplified block diagram of the distributed object messaging environment according to an embodiment of the present invention.

As shown in FIGS. 19 and 20, the Message Handling subsystem 370 provides message based interprocessor communications services. Generally all interprocess communication between processes on the server nodes is carried out via the Distributed Object Messaging Environment (DOME) 372 shown in FIG. 21. DOME 372 uses the Message Handling subsystem 370 when information must be communicated across node boundaries. The Message Handling subsystem 370 is also used for communication to non-server external systems such as the SCP Host. The Message Handling subsystem 370 implements the following features.

Common interface for multiple protocols.
  TCP/IP 374
  UDP/IP 376
  DECNET 378
  Single access identifier (Logical Link Group Name) for multiple links with same destination.
  Redundant link management (improves scalability)
  Link failure recovery
  Asynchronous receive interface Distributed Object Services Referring to FIG. 21, DOME 372 is a client/server interface used for interprocess client/server communication. It contains server interfaces 382 which allow server processes 382 to register objects and member functions for use by client processes 384. DOME 372 contains a shared memory database 380 to store the server descriptions and a stand-alone DOMEServices process (domeSrv) which maintains the server object descriptions from other nodes. It also contains client interfaces 384 which provide access to any registered server object in the node's DOME database.

The Interprocess Communications subsystem consists mainly of DOME. DOME provides the ability for a process to register a server object and it's methods in a way that allows other processes in the system to invoke those methods. DOME supports various modes of registration and access including many special routing options that aid in the development of fault resilient software. Features implemented by the Interprocess Communications subsystem include:

Registered Object Name Management across nodes and sites
  Prioritized request handling
  Active/Standby Object request routing
  Load Shared Object request routing
  Broadcast Object request routing
  Blocking/Non-Blocking Object requests Common Services The Common Utilities subsystem provides a library of programming tools to aid in the rapid development of processes designed to run on or within the platform layer. The features implemented by the Common Utilities subsystem include:

Command Line Object

Trace Object

Shared Memory Object

Semaphore Object

Keyed Dictionary Object

List Object

Replicated Keyed Dictionary Object

Shared Memory Dictionary Object etc.

DbgTrace Object

Figure 22:
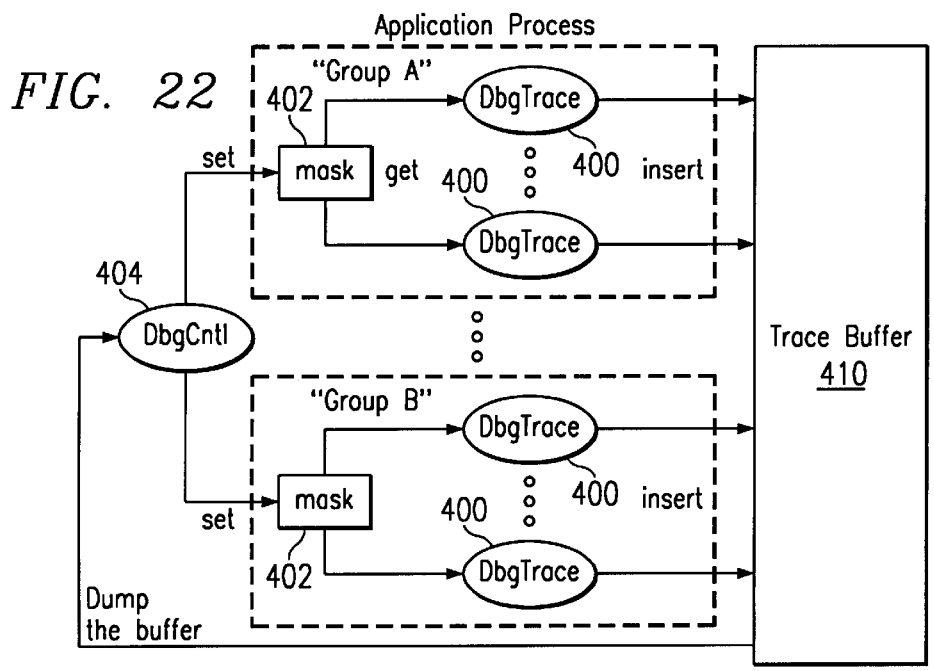
FIG. 22 is a simplified block diagram of the internal debugging and tracing object relations according to an embodiment of the present invention.

Referring to FIG. 22, the DbgTrace facilities 400 provides the ability to issue trace messages to a trace buffer, to a file, and/or to standard error. Trace data can be entered in two different formats: standard print format, and a data buffer dump format. A mask 402 may be used to filter out different levels of messages. There are 32 possible mask levels for each DbgTrace group.

The DbgCntl interface 404 is the control interface for DbgTrace objects 400. It allows users to specify many different aspects of the DbgTrace facility 400. This interface allows users to do the following things on DbgTrace objects 400:

Set/Get the mask 402 for a DbgTrace group 400.

Set/get the size of the internal message buffer 410.

Get a list of existing groups.

Turn on/off display to standard error.

Turn on/off dumping of traces one at a time to a file.

Enable/disable the ability to dump traces out to file before they get overwritten.

A DbgDisk interface allows users to specify which file the trace buffer 410 will be written to on all write requests.

The DbgTrace facility 400 allows the users to create different DbgTrace objects 400 that can each belong to one of multiple groups. This allows users to have a unique mask value for each group. All traces issued through the DbgTrace interface 400 get stored in an internal message buffer. Users can also specify whether to issue traces to standard error in addition to the internal buffer.

Trace Object

The Trace object provides the user the ability to optionally issue trace messages to standard error. When the user issues a trace, a mask is specified which represents the trace level that this trace will be output for. The Trace interface allows the user to specify a mask which all instances of trace in that UNIX process will use to determine whether or not to issue the trace message. The trace mask may supports eight unique mask values.

Dictionary Management System

Figure 23:
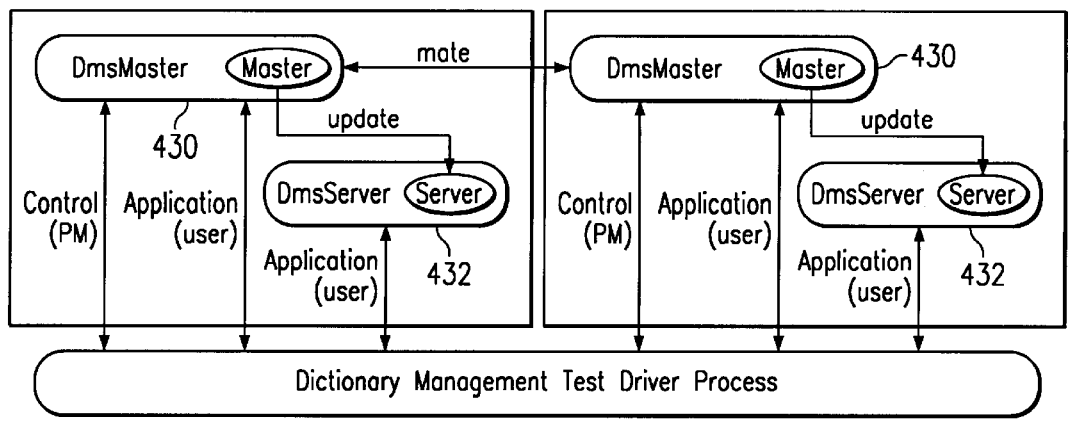
FIG. 23 is a simplified block diagram of the dictionary management system according to an embodiment of the present invention.

Referring to FIG. 23, Dictionary Management provides classes which are designed to support data storage and access. Dictionaries can be stored on disk (persistent) or stored in memory. Dictionaries can also be private (used by local process only) or shared (accessible by multiple processes). The purposes of these dictionaries are defined by the application program. The primary interaction between DmsMaster 430 and DmsServer 432 is that DmsMaster 430 updates DmsServer 432 when it receives an update message from the application. DmsMaster 430 runs as active/standby in the platform manager nodes, and DmsServer 432 runs in all (or a subset) of the IPUs.

Event Services

Event services provide the capability to generate and distribute specific occurrences significant to a task among loosely coupled processes. An example of an event is the completion of an input/output transfer. The event services may be a CORBA-based interprocess communication facility. It uses standard CORBA requests that result in the execution of an operation by an object. This is accomplished through the event manager implemementation program.

By defining two distinct roles for objects, communication is decoupled between objects; creating asynchronous communication. One object receives and accumulates new events, while the other object registers an interest to be forwarded these new events. This is accomplished by two CORBA classes, EventManager and EventReceiver. EventManager provides an interface definition language (IDL) interface for receiving new events. EventReceiver provides an interface definition language interface for clients interested in receiving events.

Software and Hardware Representation

Figure 24:
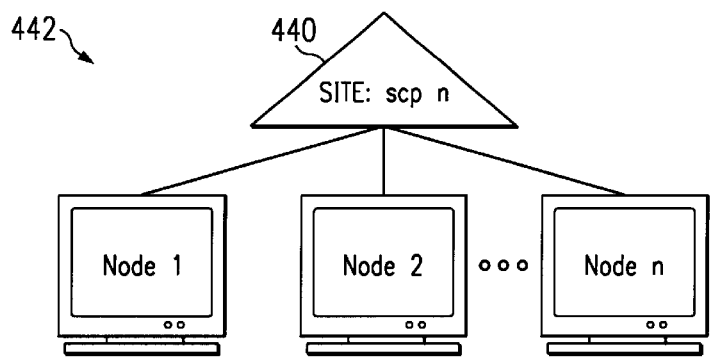
FIG. 24 is a simplified block diagram of the hardware representation of the telecom platform according to an embodiment of the present invention.

FIG. 24 shows the hardware view of a telecom platform system. At the highest level, a telecom platform system consists of one or more sites 440. Within a site 440, multiple nodes 442 exist.

Figure 25:
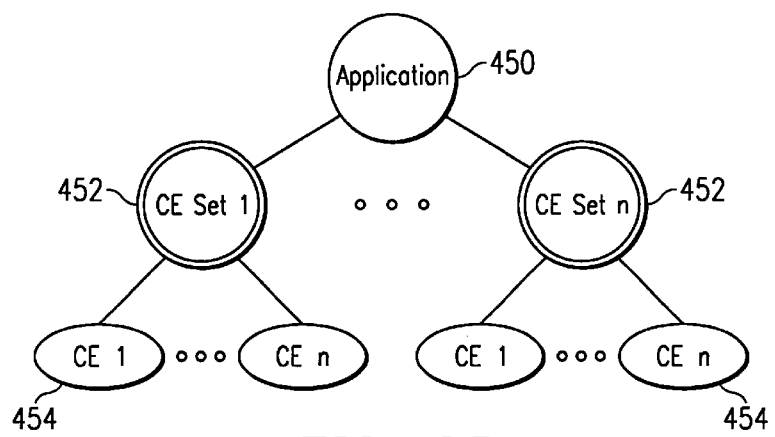
FIG. 25 is a simplified block diagram of the software representation of the telecom platform according to an embodiment of the present invention.

The software representation is a hierarchy allowing components of software to be grouped together. FIG. 25 shows this hierarchy. An Application 450 exists at the highest level. An Application 450 is made up of one or more configurable element sets 452, which is made up of one or more configurable elements 454. Multiple applications 450 can be defined within a system. All of the applications 450 within a system make up the software representation of a system.

Figure 26:
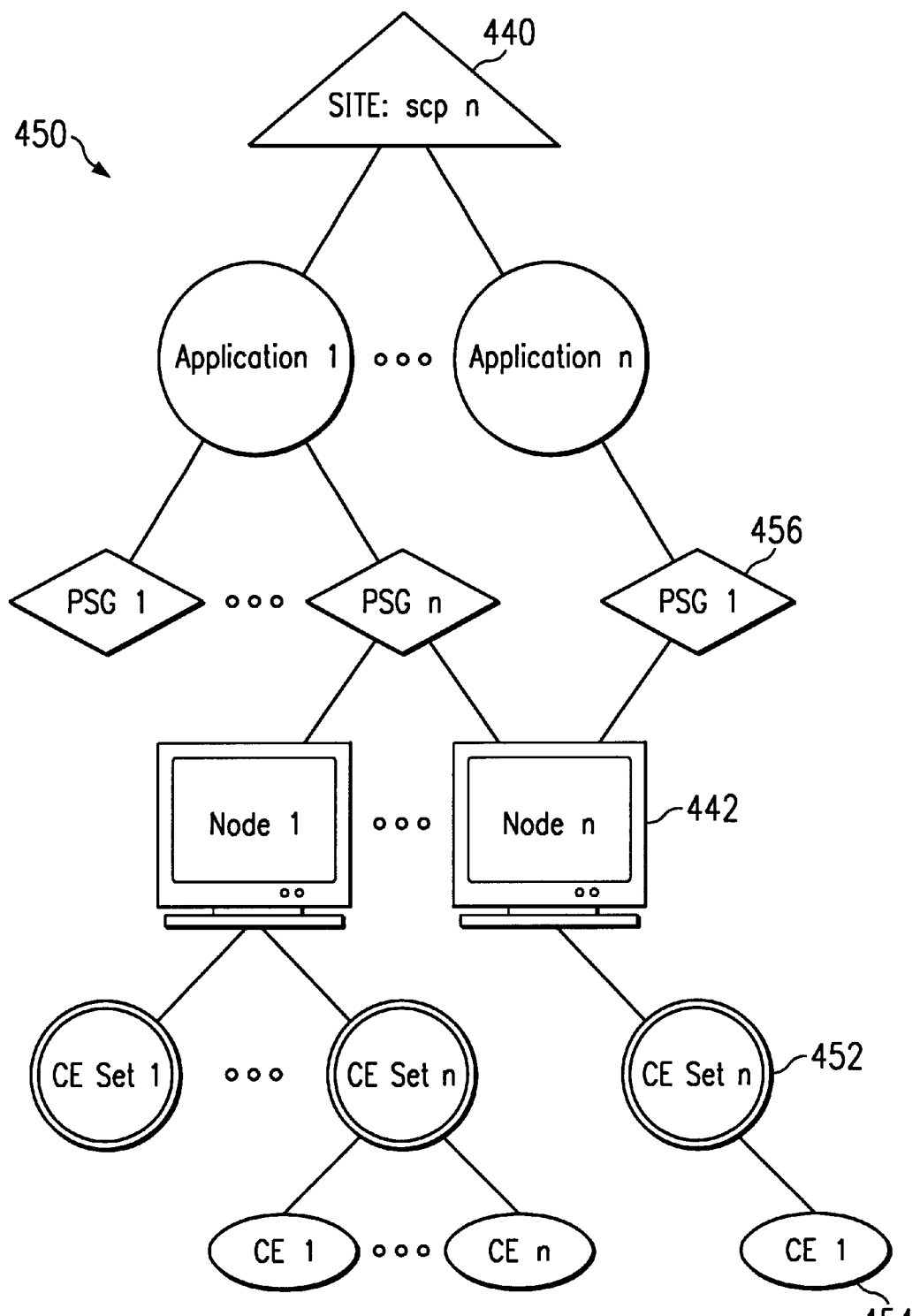
FIG. 26 is a simplified block diagram showing dynamic mapping of software onto hardware representation of the telecom platform according to an embodiment of the present invention.

The dynamic mapping of software onto hardware representation of a system shown in FIG. 26 depicts how pieces of an application 450 are placed onto nodes 442. Sites 440 contain applications 450. Applications 450 have processor service groups 456. Processor service groups 456 span multiple nodes 442. Nodes 442 have configurable element sets 452 placed on them. Configurable elements 454 reside within configurable element sets 452. For example, a software representation of a time dependent routing application may have two configurable element sets: WestCoastSet and EastCoastSet. Within the WestCoastSet, the time dependent routing application could have all of the programs that need to run on the nodes targeted to handle West Coast calls. These might include database programs, link processes, etc. that are configured specifically for West Coast handling. Within the EastCoastSet, the time dependent routing application may have all of the programs that need to run on the nodes targeted to handle West Coast calls. The time dependent routing application would then be allocated onto a site. Nodes that will run the time dependent routing application will be grouped into processor service groups. The configurable element sets for the application would then be placed on nodes that have been placed into a time dependent routing application processor service group.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of providing a software interface between application programs performing telecommunications functions and an operating system running on at least one node at a site supporting the application programs, and further forming an interface between the application programs and a telecommunications network, comprising:

supplying network management processes operable to provide inter-node configuration, monitoring and management functionality;

supplying node management processes operable to provide node initialization, configuration, monitoring, and management functionality;

supplying event processes operable to provide initialization, termination, and distribution of tasks in response to predetermined events;

supplying common processes operable to provide a library of a plurality of programming tools for the development of the application programs;

supplying communications processes operable to provide message handling functionality; and supplying distributed object processes operable to provide a distributed database repository for object-based communications.

2. The method, as set forth in claim 1, wherein providing the network management processes comprise:

providing a network platform manager operable to remove nodes from service, restore nodes to service, remove applications from service, and restore applications to service;

providing a network system integrity manager operable to monitor the nodes and to enable failed nodes to recover; and providing a configuration manager operable to interface with a host coupled to the telecom platform.

3. The method, as set forth in claim 2, wherein providing the node management processes comprise:

providing a node platform manager operable to provide management functions for a node;

providing a service manager operable to start and stop processes at the direction of the node platform manager; and providing a node system integrity manager operable to monitor inter-node links.

4. The method, as set forth in claim 3, comprising:

monitoring and detecting a failure in a configurable element;

notifying the fault to the service manager;

generating, by the service manager, a status change for the configurable element and forwarding the notification to the node system integrity manager;

forwarding, by the node system integrity manager, the notification to the node platform manager;

determining, by the node platform manager, the node status in response to the failed configurable element; and notifying the net platform manager, by the node platform manger, of a node status change.

5. The method, as set forth in claim 4, further comprising:

determining, by the network platform manager, a status change in an application having the failed configurable element and a status change in a processor service group having the application having the failed configurable element; and notifying any status change to the configuration manager.

6. The method, as set forth in claim 5, further comprising forwarding, by the configuration manager, a node, processor service group or application status change to a host.

7. The method, as set forth in claim 3, further comprising:

registering with an event manager, by an application, an interest to receive a particular event;

sending, by an event receiver, the particular event to the registered application.

8. The method, as set forth in claim 1, further comprising:

running the network management processes on at least one platform management node; and running the node management processes on at least one application node coupled to the at least one platform management node.

9. The method, as set forth in claim 8, further comprising running the network management processes and the node management processes on a platform management node also serving as an application node.

10. The method, as set forth in claim 8, further comprising:

operating a first platform management node in an active mode; and operating a second platform management node in a standby mode.

11. The method, as set forth in claim 8, further comprising operating two or more platform management nodes operating in a load-sharing mode.

12. The method, as set forth in claim 1, further comprising supplying statistics processes operable to provide methods to access system measurement data and to generate reports on the system measurement data.

13. The method, as set forth in claim 12, wherein supplying statistics processes comprise:

providing a peg counter process operable to count specific events occurring across multiple nodes;

providing a time metering process operable to accumulate the duration of a specific event;

providing a data collection process operable to collect counter data on a node and storing the collected data.

14. The method, as set forth in claim 1, further comprising supplying information and problem report and alarm processes operable to provide error condition monitoring, alarms, and reporting.

15. The method, as set forth in claim 1, further comprising supplying dictionary processes operable to provide data storage and access methods.

16. The method, as set forth in claim 1, further comprising supplying graphical user interface processes operable to provide graphical user interface building methods.

17. The method, as set forth in claim 1, wherein providing the event processes comprise:

providing an event manager operable to register client processes wishing to receive events; and providing an event receiver operable to provide an interface for client processes which are registered to receive events.

18. The method, as set forth in claim 1, wherein providing the common processes comprise providing a timer manager operable to provide date and time functionality.

19. The method, as set forth in claim 1, further comprising:

running a boot script;

starting a service manager in accordance to the boot script;

starting, by the service manager, a node platform manager for a node;

starting, by the service manager, PRE-MIN configuration elements for the node;

starting, by the service manager, OS-MIN configuration elements for the node; and upgrading a state of the node in response to the OS-MIN configuration elements in the node.

20. A telecom platform forming an interface between application programs performing telecommunications functions and an operating system running on at least one node at a site supporting the application programs, and further forming an interface between the application programs and a telecommunications network, comprising:

network management processes operable to provide inter-node configuration, monitoring and management functionality;

node management processes operable to provide node initialization, configuration, monitoring, and management functionality;

event processes operable to provide initialization, termination, and distribution of tasks in response to predetermined events;

common processes operable to provide a library of a plurality of programming tools for the development of the application programs;

communications processes operable to provide message handling functionality; and distributed object processes operable to provide a distributed database repository for object-based communications.

21. The telecom platform, as set forth in claim 20, further comprising:

at least one platform management node on which network management processes are supported;

at least one application node coupled to the at least one platform management node on which node management processes are supported.

22. The telecom platform, as set forth in claim 21, wherein the at least one platform management node is also the at least one application node.

23. The telecom platform, as set forth in claim 21, wherein the at least one platform management node comprises:

a first platform management node operating in an active mode; and a second platform management node operating in a standby mode.

24. The telecom platform, as set forth in claim 21, wherein the at least one platform management node comprises two or more platform management nodes operating in a load-sharing mode.

25. The telecom platform, as set forth in claim 20, further comprising statistics processes operable to provide methods to access system measurement data and to generate reports on the system measurement data.

26. The telecom platform, as set forth in claim 25, wherein the statistics processes comprise:

a peg counter process operable to count specific events occurring across multiple nodes;

a time metering process operable to accumulate the duration of a specific event;

a data collection process operable to collect counter data on a node and storing the collected data.

27. The telecom platform, as set forth in claim 20, further comprising information and problem report and alarm processes operable to provide error condition monitoring, alarms, and reporting.

28. The telecom platform, as set forth in claim 20, further comprising dictionary processes operable to provide data storage and access methods.

29. The telecom platform, as set forth in claim 20, further comprising graphical user interface processes operable to provide graphical user interface building methods.

30. The telecom platform, as set forth in claim 20, wherein the network management processes comprise:

a network platform manager operable to remove nodes from service, restore nodes to service, remove applications from service, and restore applications to service;

a network system integrity manager operable to monitor the nodes and to enable failed nodes to recover; and a configuration manager operable to interface with a host coupled to the telecom platform.

31. The telecom platform, as set forth in claim 20, wherein the node management processes comprise:

a node platform manager operable to provide management functions for a node;

a service manager operable to start and stop processes at the direction of the node platform manager; and a node system integrity manager operable to monitor inter-node links.

32. The telecom platform, as set forth in claim 20, wherein the event processes comprise:

an event manager operable to register client processes wishing to receive events; and an event receiver operable to provide an interface for client processes which are registered to receive events.

33. The telecom platform, as set forth in claim 20, wherein the common processes comprise a timer manager operable to provide date and time functionality.

34. A method of providing a software interface between application programs performing telecommunications functions and an operating system running on at least one node at a site supporting the application programs, and further forming an interface between the application programs and a telecommunications network, comprising:

providing a network platform manager operable to remove nodes from service, restore nodes to service, remove applications from service, and restore applications to service;

providing a network system integrity manager operable to monitor the nodes and to enable failed nodes to recover;

providing a configuration manager operable to interface with a host coupled to the telecom platform;

providing a node platform manager operable to provide management functions for a node;

providing a service manager operable to start and stop processes at the direction of the node platform manager; and providing a node system integrity manager operable to monitor inter-node links.

35. The method, as set forth in claim 34, comprising:

monitoring and detecting a failure in a configurable element;

notifying the fault to the service manager;

generating, by the service manager, a status change for the configurable element and forwarding the notification to the node system integrity manager;

forwarding, by the node system integrity manager, the notification to the node platform manager;

determining, by the node platform manager, the node status in response to the failed configurable element; and notifying the net platform manager, by the node platform manger, of a node status change.

36. The method, as set forth in claim 35, further comprising:
   determining, by the net platform manager, a status change in an application having the failed configurable element and a status change a processor service group having the application having the failed configurable element; and
   notifying any status change to the configuration manager.

37. The method, as set forth in claim 36, further comprising forwarding, by the configuration manager, a node, processor service group or application status change to a host.

38. The method, as set forth in claim 34, further comprising:
   providing an event manager operable to register client processes wishing to receive events; and
   providing an event receiver operable to provide an interface for client processes which are registered to receive events.

39. The method, as set forth in claim 34, further comprising providing a timer manager operable to provide date and time functionality.

40. The method, as set forth in claim 34, further comprising:
   providing a peg counter process operable to count specific events occurring across multiple nodes;
   providing a time metering process operable to accumulate the duration of a specific event;
   providing a data collection process operable to collect counter data on a node and storing the collected data.

41. The method, as set forth in claim 34, further comprising:
   running a boot script;
   starting a service manager in accordance to the boot script;
   starting, by the service manager, a node platform manager for a node;
   starting, by the service manager, PRE-MIN configuration elements for the node;
   starting, by the service manager, OS-MIN configuration elements for the node; and
   upgrading a state of the node in response to the OS-MIN configuration elements in the node.

42. The method, as set forth in claim 34, further comprising:
   registering with an event manager, by an application, an interest to receive a particular event;
   sending, by an event receiver, the particular event to the registered application.

* * * * *